United States Patent
Keum et al.

(10) Patent No.: US 12,335,193 B2
(45) Date of Patent: Jun. 17, 2025

(54) METHOD AND APPARATUS FOR ESTIMATING PHASE NOISE IN WIRELESS COMMUNICATION SYSTEM

(71) Applicants: LG ELECTRONICS INC., Seoul (KR); KOREA ADVANCED INSTITUTE OF SCIENCE AND TECHNOLOGY, Daejeon (KR)

(72) Inventors: Seungwon Keum, Daejeon (KR); Jaehoon Chung, Seoul (KR); Sangrim Lee, Seoul (KR); Dongho Cho, Seoul (KR); Juyong Lee, Daejeon (KR); Sangmi Noh, Daejeon (KR); Dangoh Kim, Sejong (KR); Seongjae Kim, Daejeon (KR)

(73) Assignee: LG ELECTRONICS INC., Seoul (KR)

( * ) Notice: Subject to any disclaimer, the term of this patent is extended or adjusted under 35 U.S.C. 154(b) by 350 days.

(21) Appl. No.: 18/014,667

(22) PCT Filed: Jul. 10, 2020

(86) PCT No.: PCT/KR2020/009136
§ 371 (c)(1),
(2) Date: Jan. 5, 2023

(87) PCT Pub. No.: WO2022/010014
PCT Pub. Date: Jan. 13, 2022

(65) Prior Publication Data
US 2023/0275729 A1    Aug. 31, 2023

(51) Int. Cl.
*H04L 27/26*    (2006.01)
*H04L 5/00*    (2006.01)
(Continued)

(52) U.S. Cl.
CPC ........ *H04L 5/0051* (2013.01); *H04L 27/2605* (2013.01); *H04L 27/261* (2013.01); *H04W 74/0833* (2013.01)

(58) Field of Classification Search
CPC ....... H04B 17/309; H04L 25/02; H04L 25/03; H04L 27/2605; H04L 27/2607;
(Continued)

(56) References Cited

U.S. PATENT DOCUMENTS

2019/0081844 A1*    3/2019    Lee .................. H04L 5/0048

FOREIGN PATENT DOCUMENTS

| KR | 1020130047688 | 5/2018 |
| KR | 1020180046350 | 5/2018 |

(Continued)

*Primary Examiner* — Melvin C Marcelo
*Assistant Examiner* — Natali Pascual Peguero
(74) *Attorney, Agent, or Firm* — BRYAN CAVE LEIGHTON PAISNER LLP

(57) ABSTRACT

A method for estimating a phase noise by a wireless device in a wireless communication system according to an embodiment of the present disclosure comprises the steps of: receiving a pre-configured pilot signal and a phase tracking reference signal (PTRS); calculating a first phase noise on the basis of the pre-configured pilot signal; calculating a common phase error (CPE) on the basis of the phase tracking reference signal (PTRS); and estimating a phase noise (PN) on the basis of the first phase noise and the common phase error (CPE). The PN is estimated through interpolation based on a specific reference point, and the specific reference point is based on the first phase noise and the CPE.

14 Claims, 29 Drawing Sheets

(51) Int. Cl.
*H04W 74/08* (2024.01)
*H04W 74/0833* (2024.01)

(58) Field of Classification Search
CPC .............. H04L 27/261; H04L 27/2613; H04L 27/2657; H04L 27/2675; H04L 27/2689; H04L 5/0051; H04L 5/0053; H04W 56/00; H04W 74/0833; H04W 56/0035
See application file for complete search history.

(56) References Cited

FOREIGN PATENT DOCUMENTS

| KR | 1020190052164 | 5/2019 |
| KR | 10-2023-0051656 A | 4/2023 |
| WO | 2017188591 | 11/2017 |
| WO | 2018182244 | 10/2018 |

* cited by examiner

[FIG. 1]
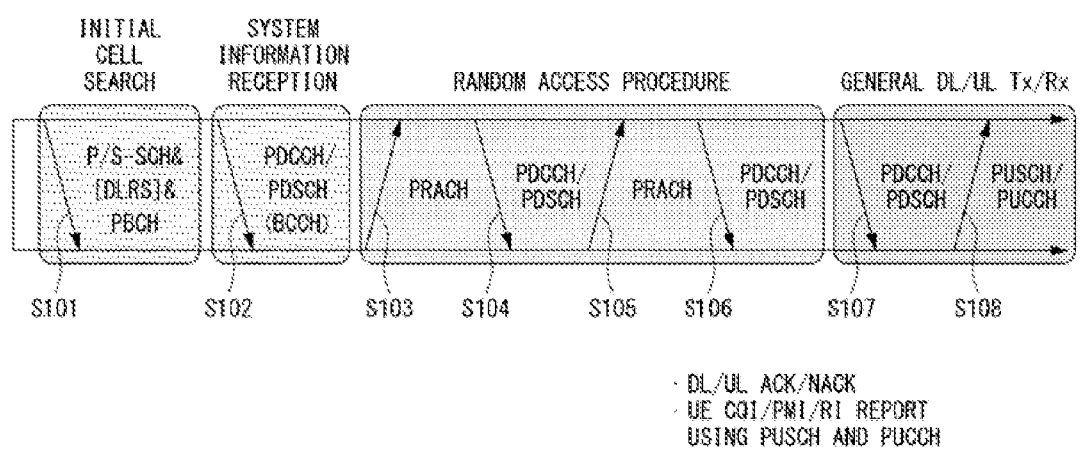

[FIG. 2]
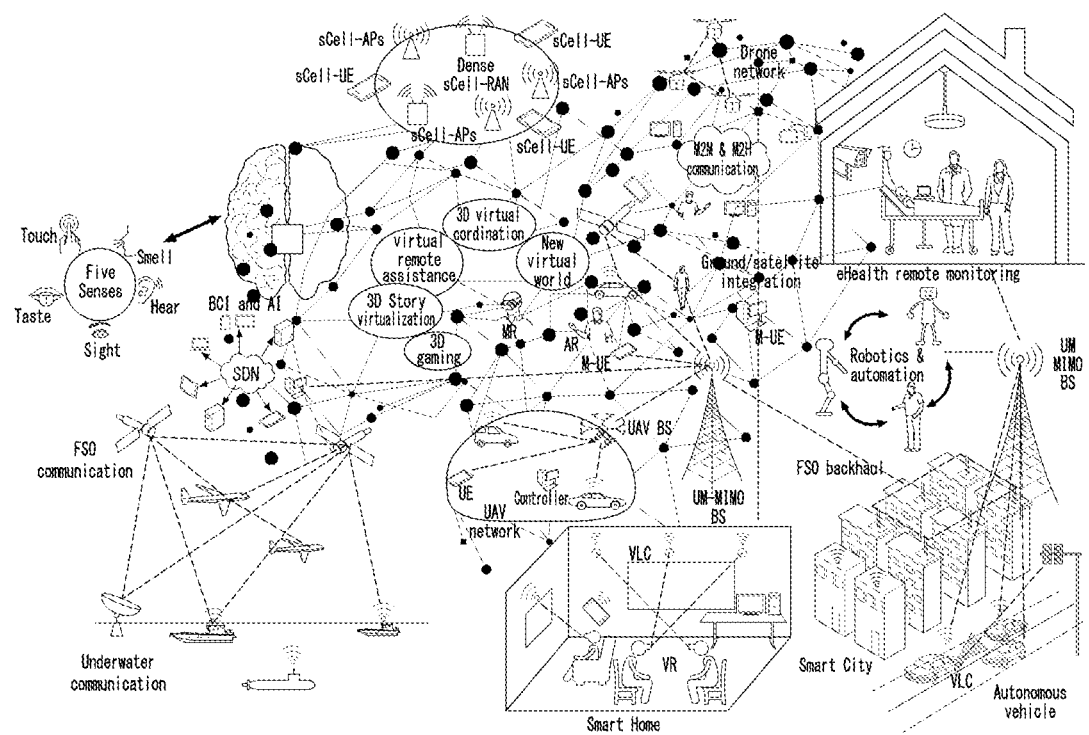

[FIG. 3]
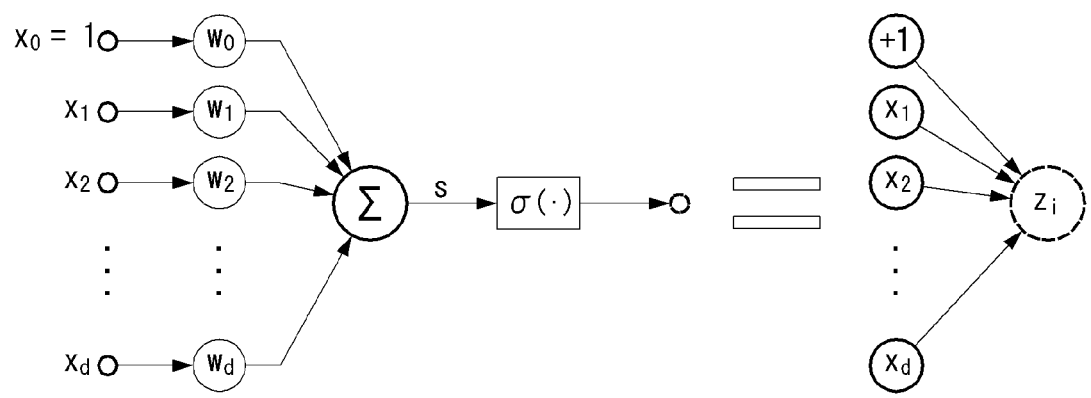

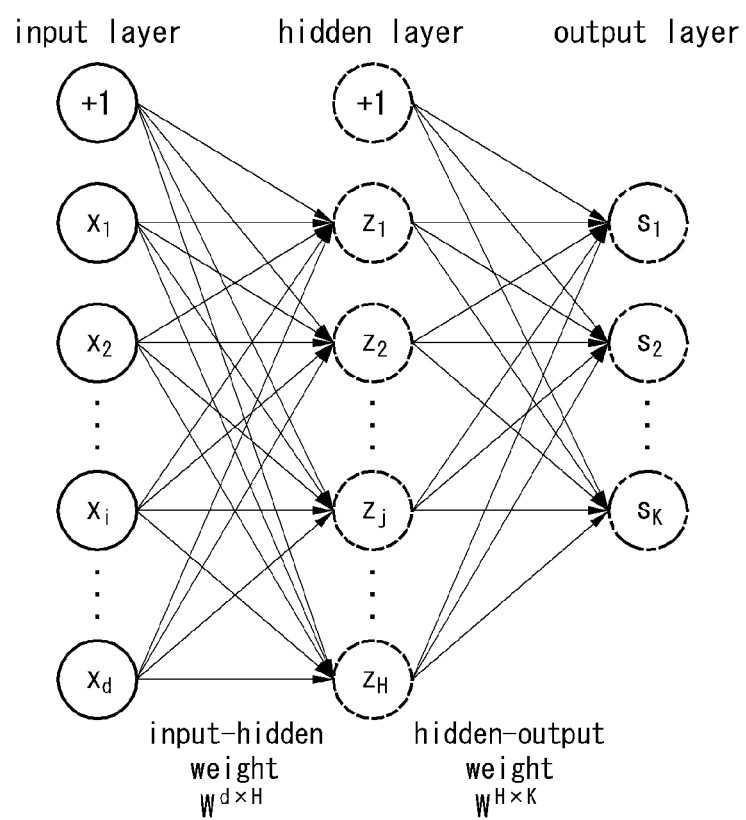
[FIG. 4]

[FIG. 5]
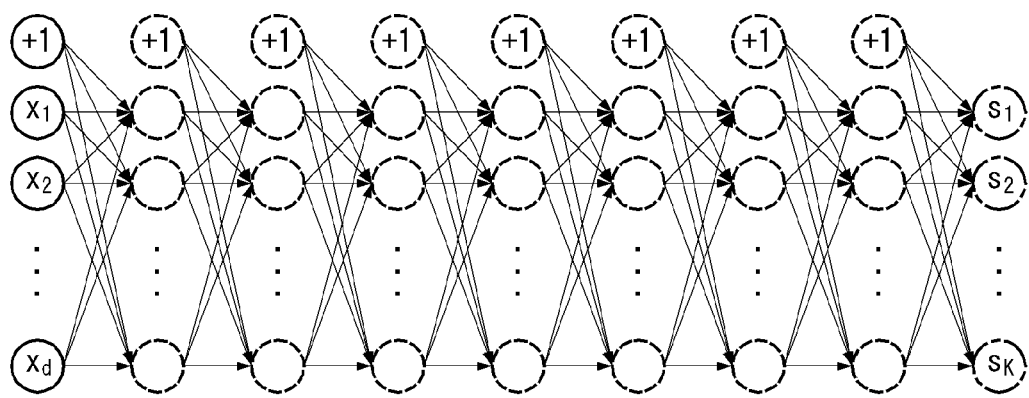

[FIG. 6]
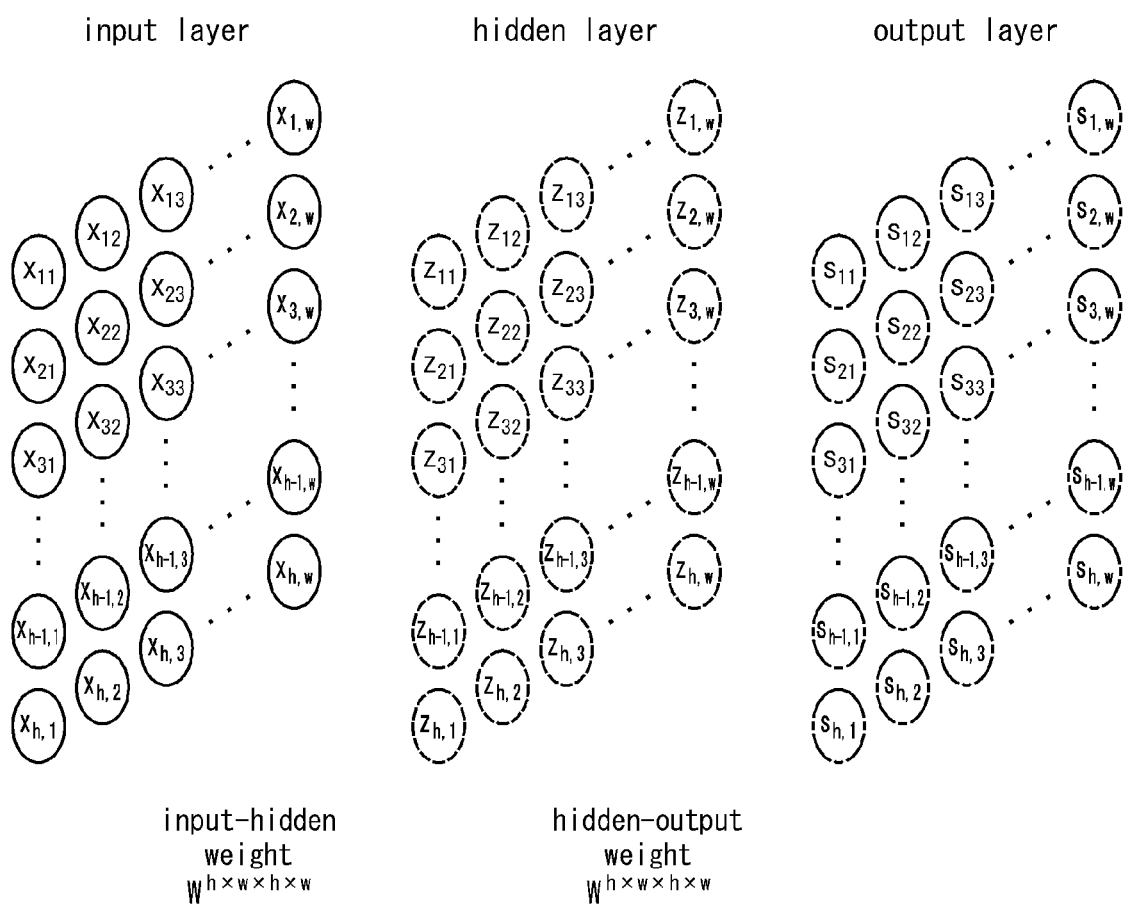

[FIG. 7]
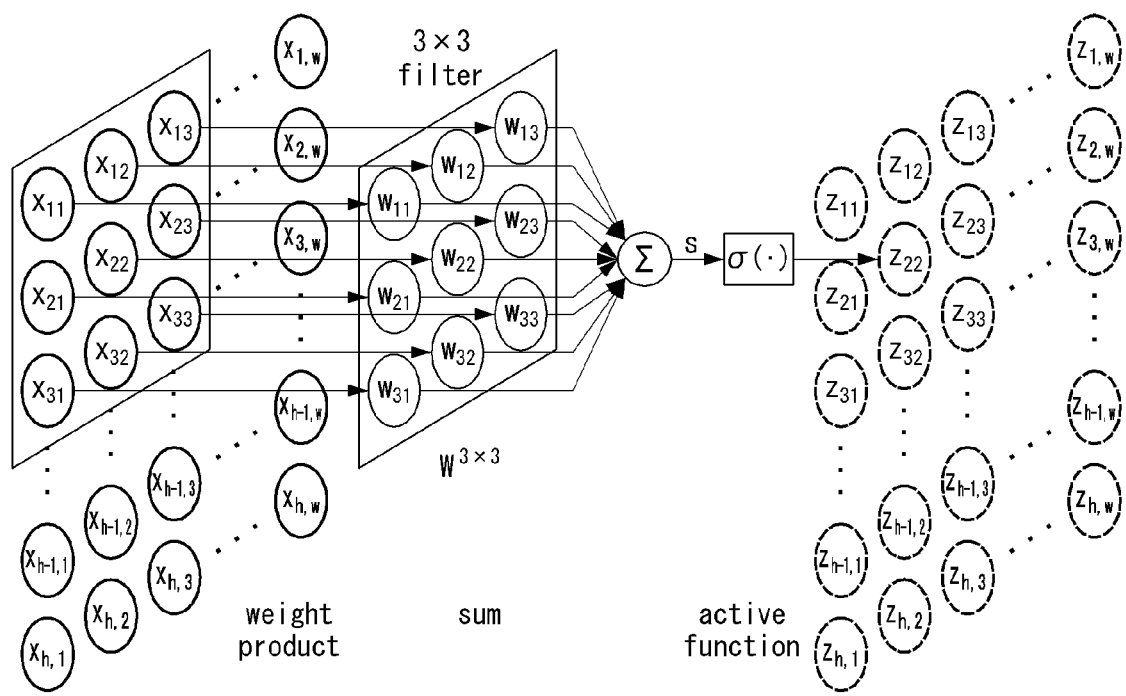

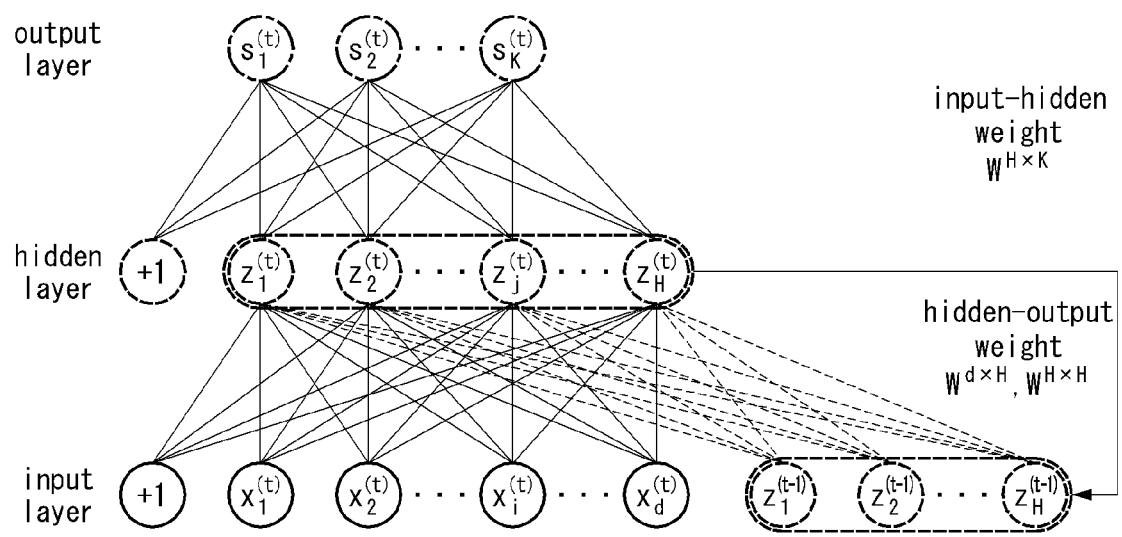
[FIG. 8]

[FIG. 9]
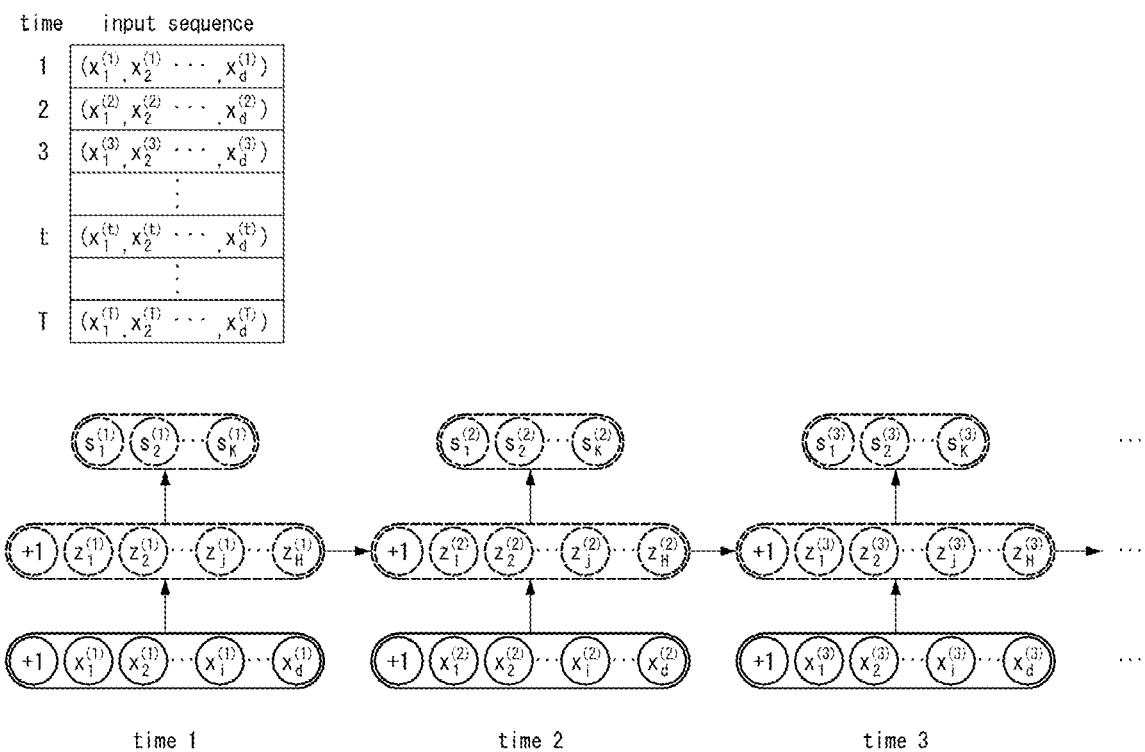

[FIG. 10]
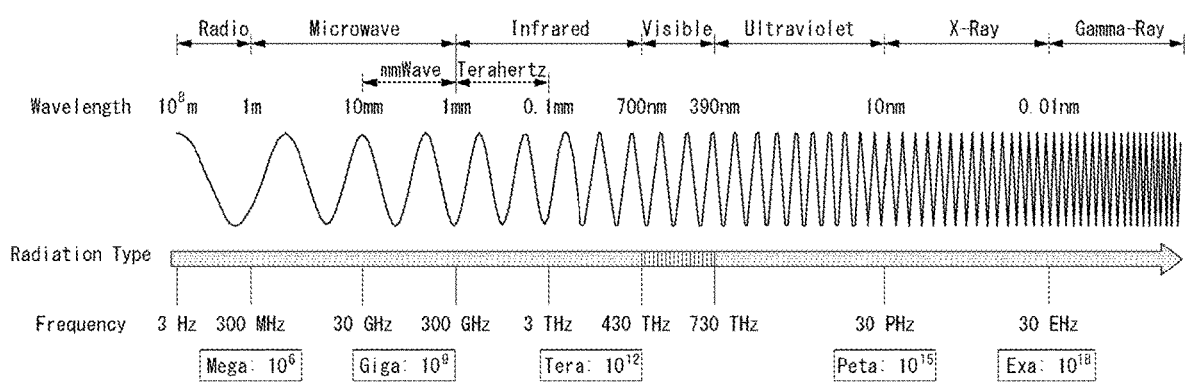

[FIG. 11]
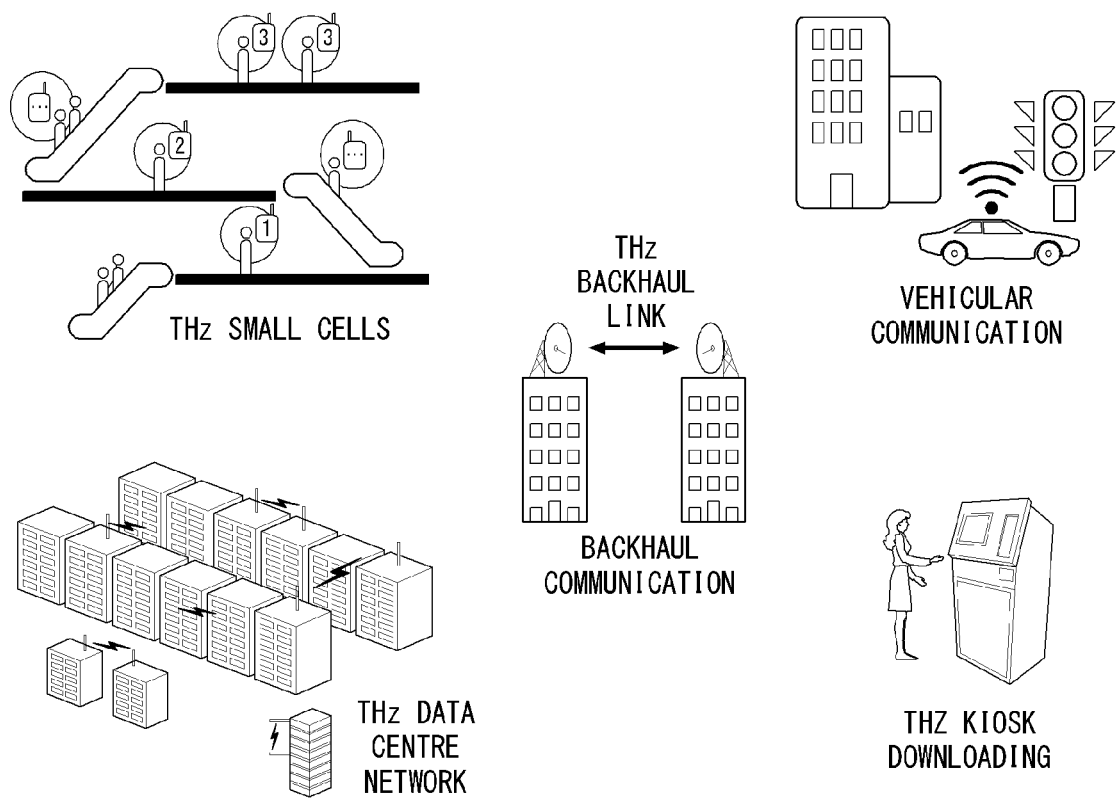

[FIG. 12]
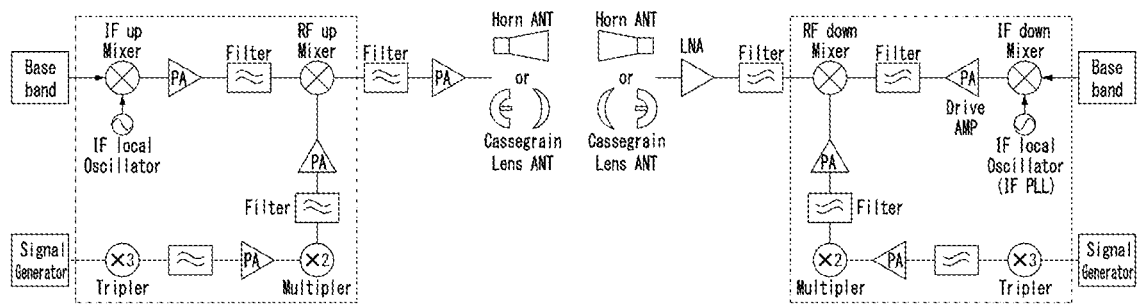
[FIG. 13]
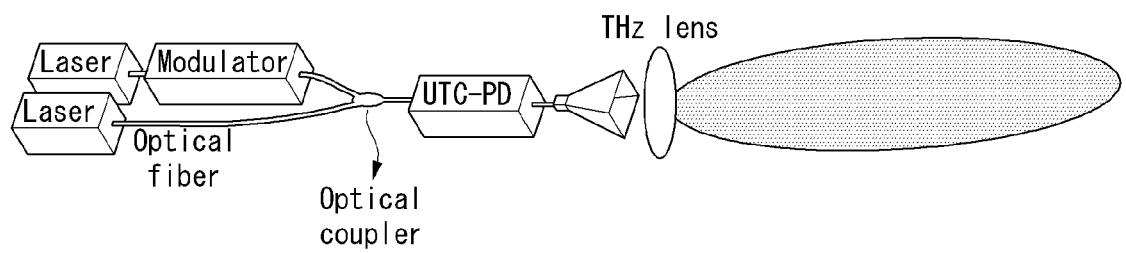

[FIG. 14]
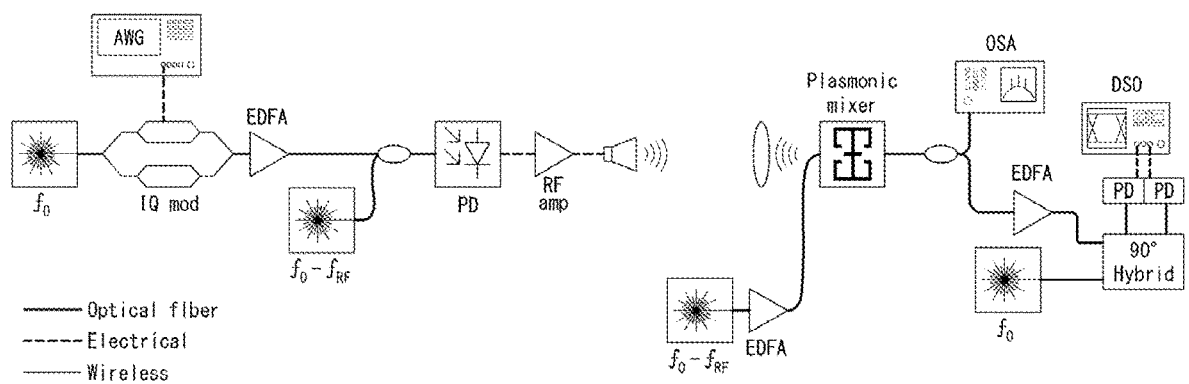

[FIG. 15]
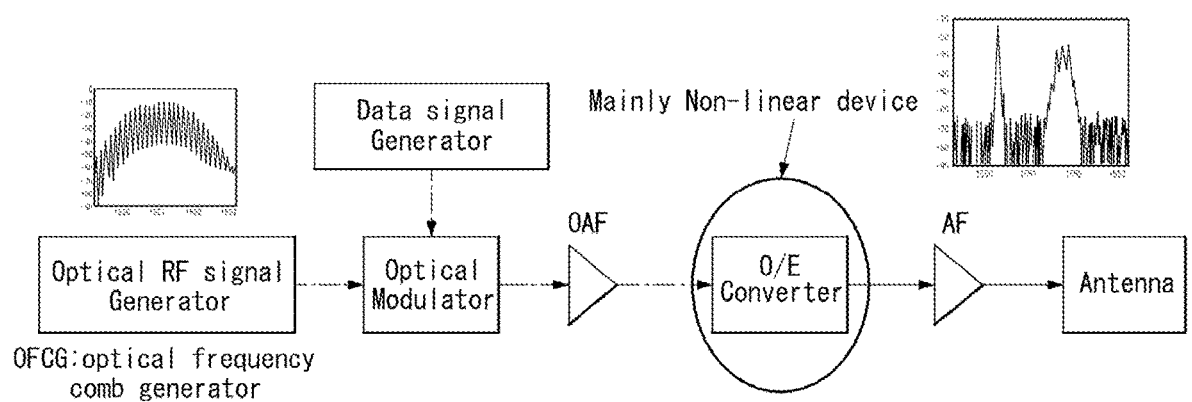

[FIG. 16]
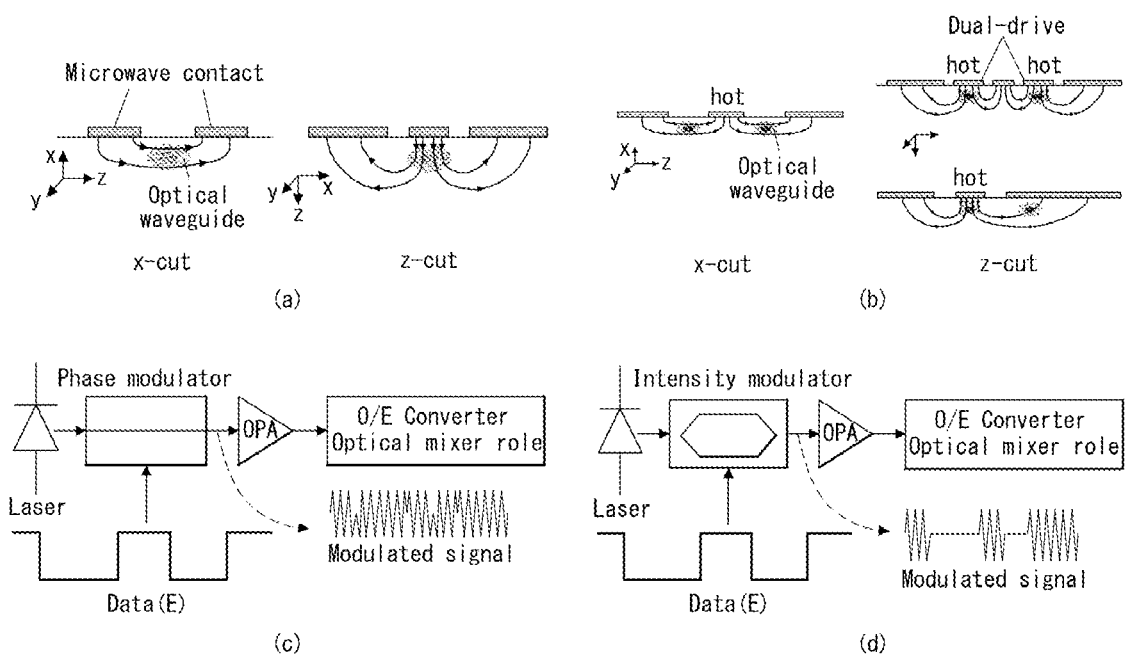

[FIG. 17]
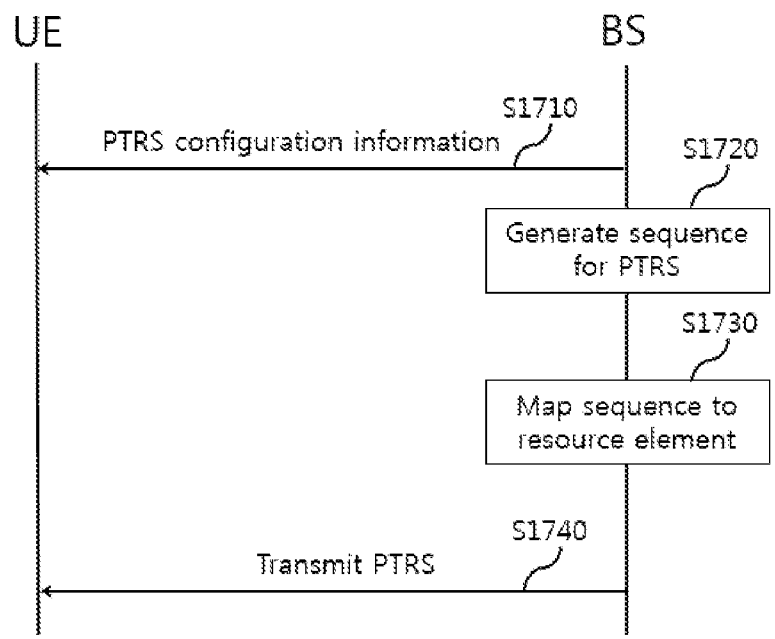

[FIG. 18]
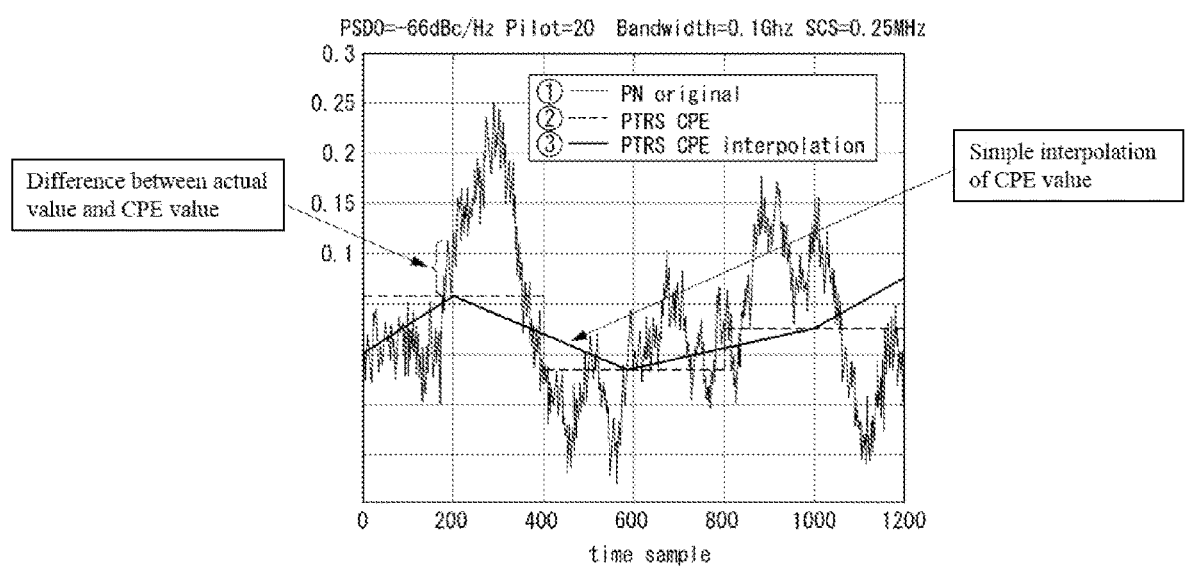

[FIG. 19]
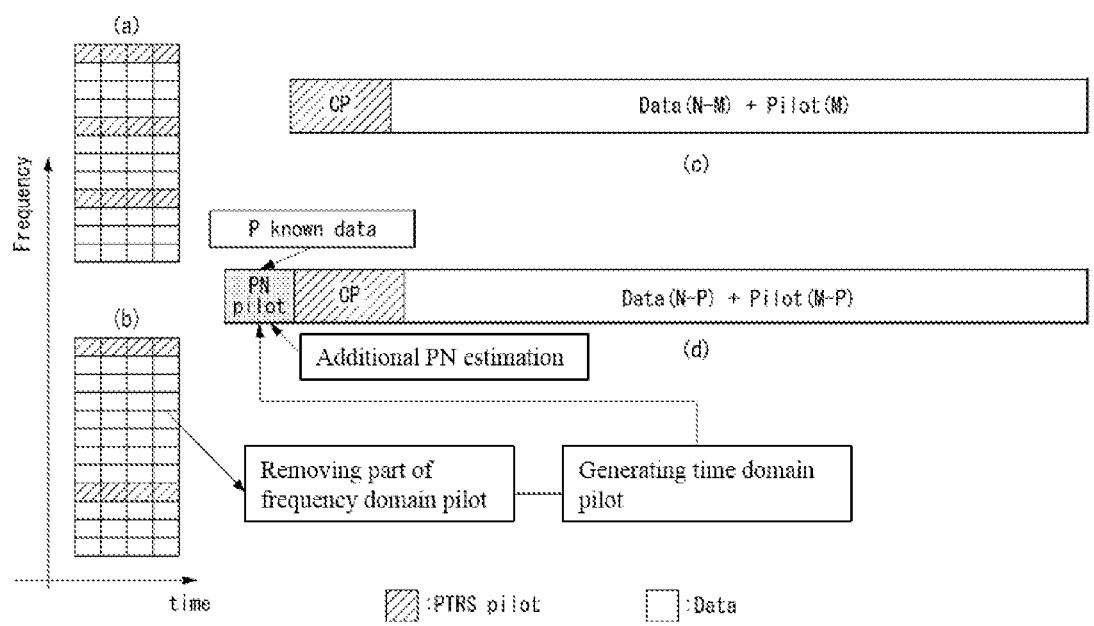

[FIG. 20]
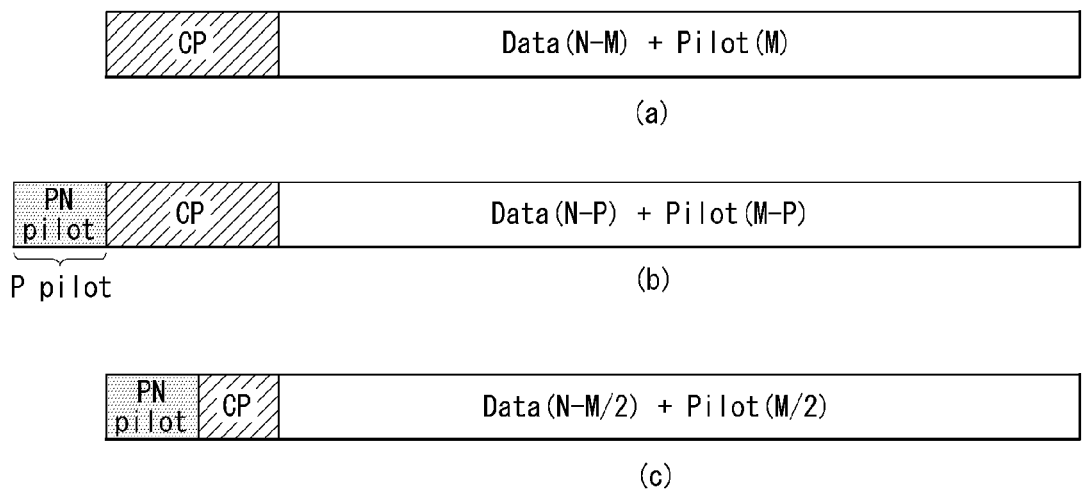
[FIG. 21]
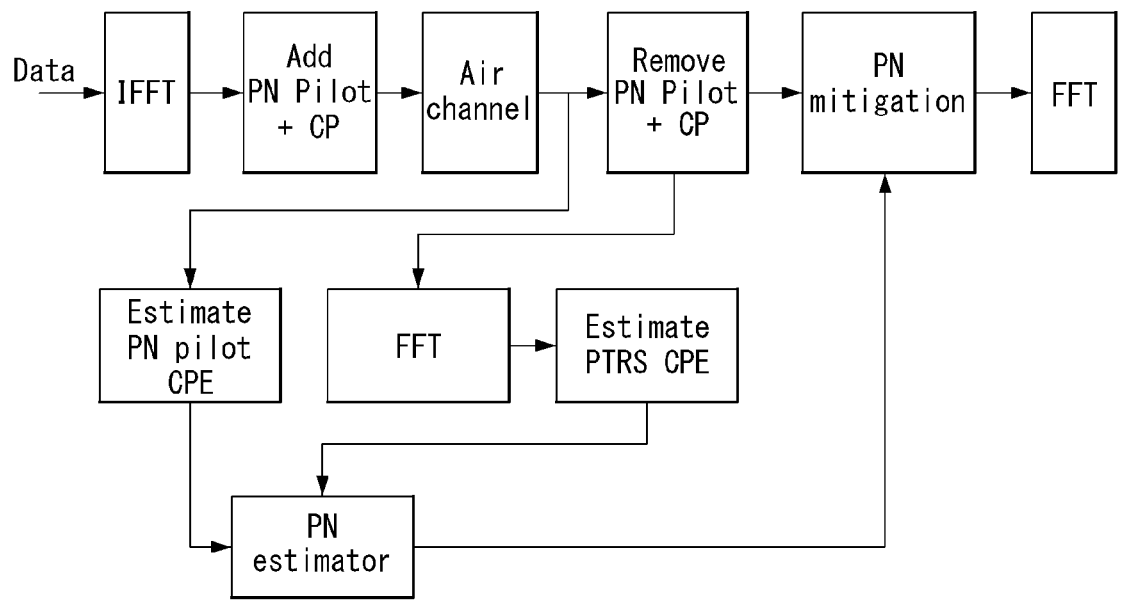

[FIG. 22]
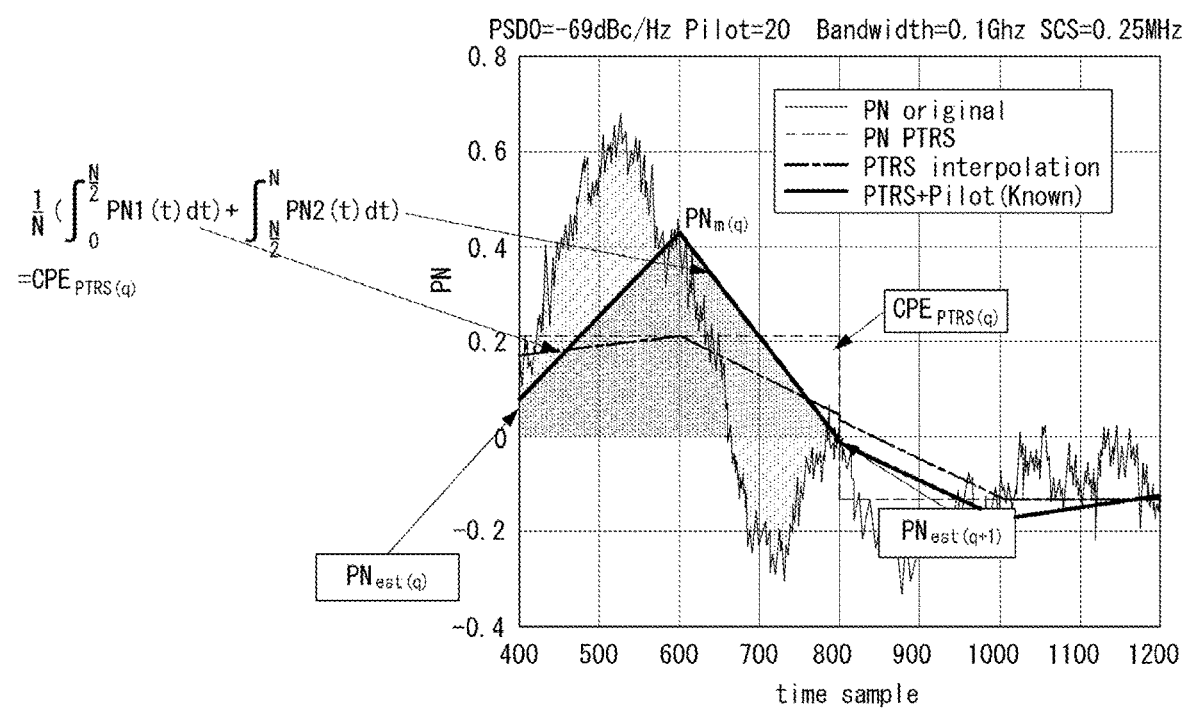

[FIG. 23]
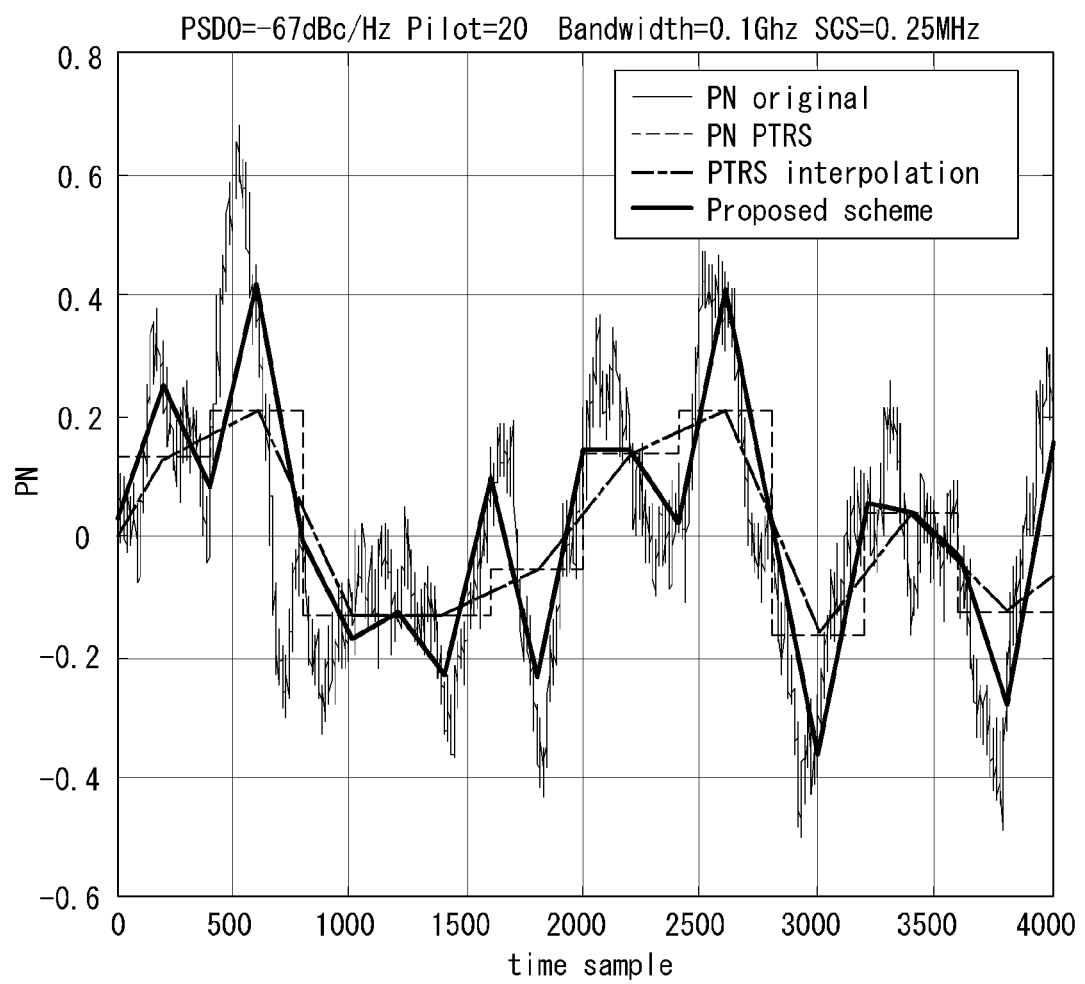

[FIG. 24]
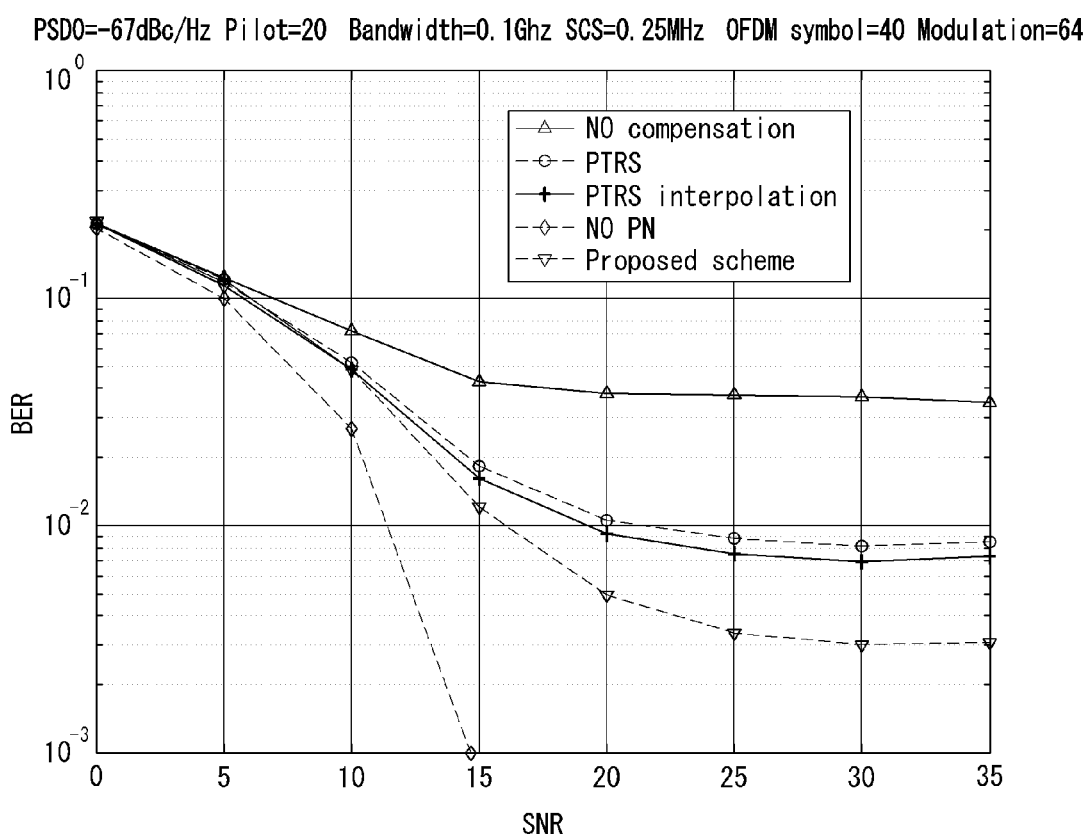

[FIG. 25]
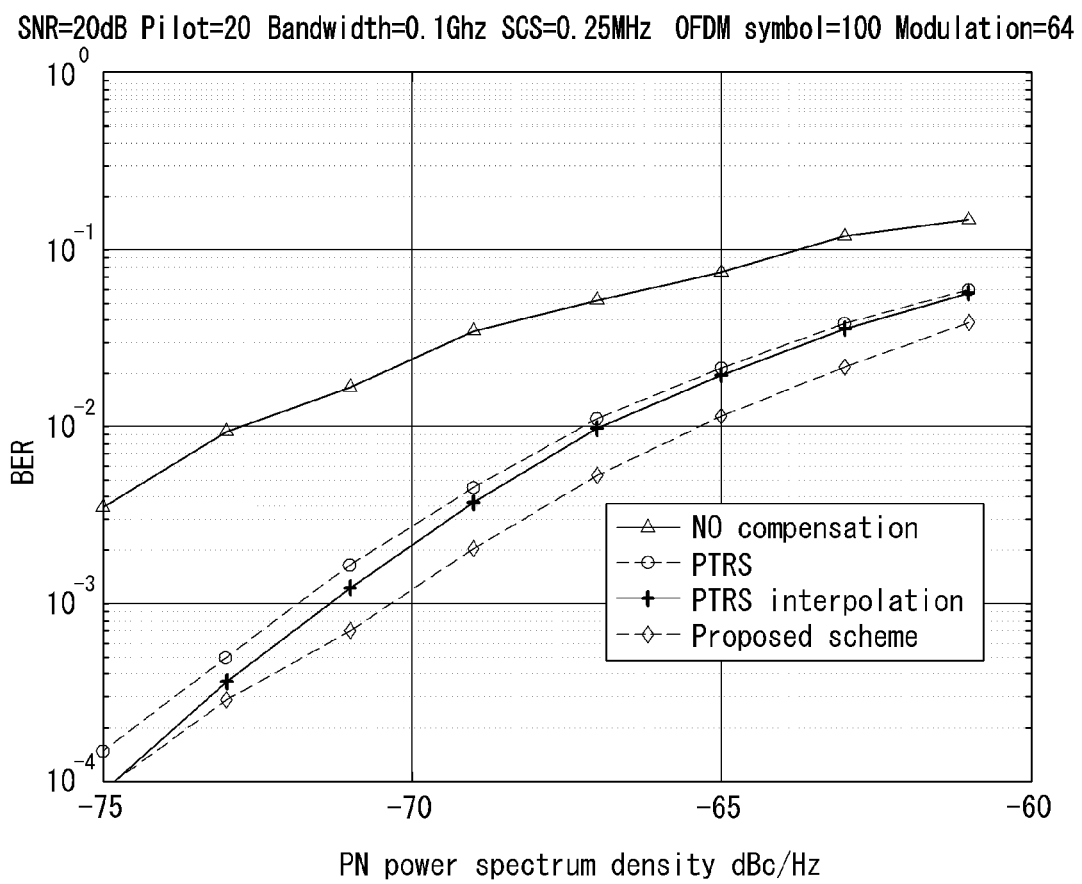

[FIG. 26]
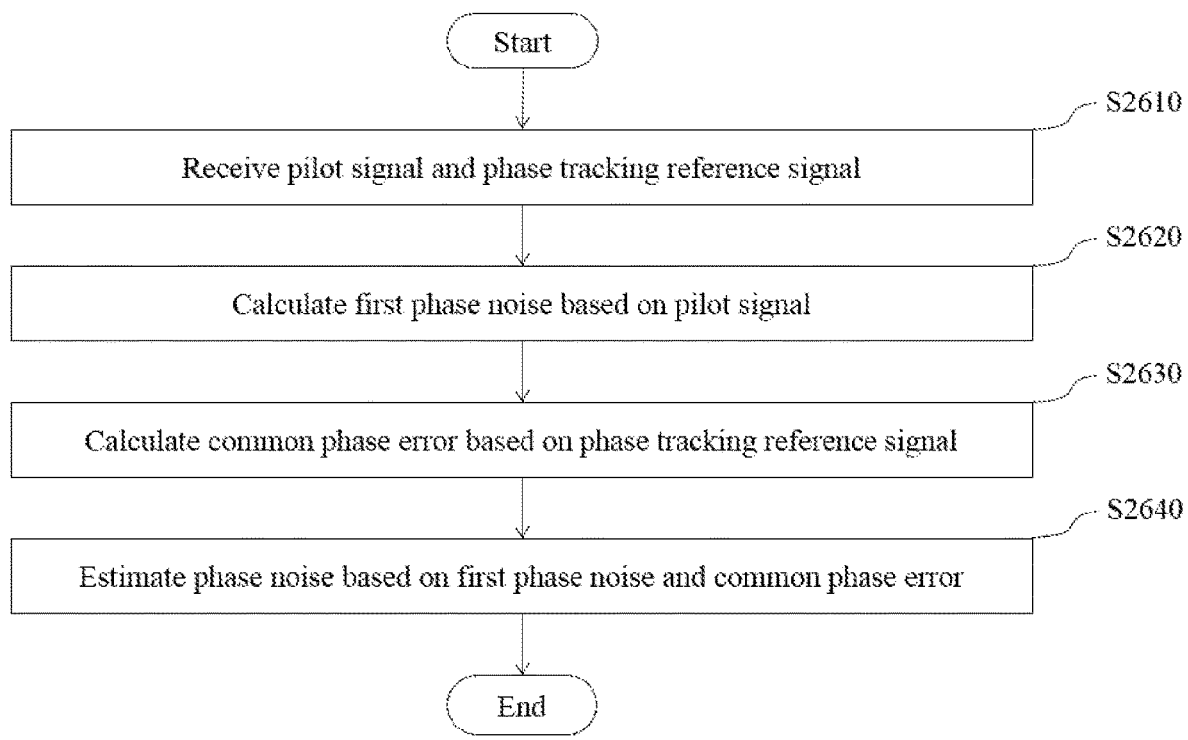

[FIG. 27]
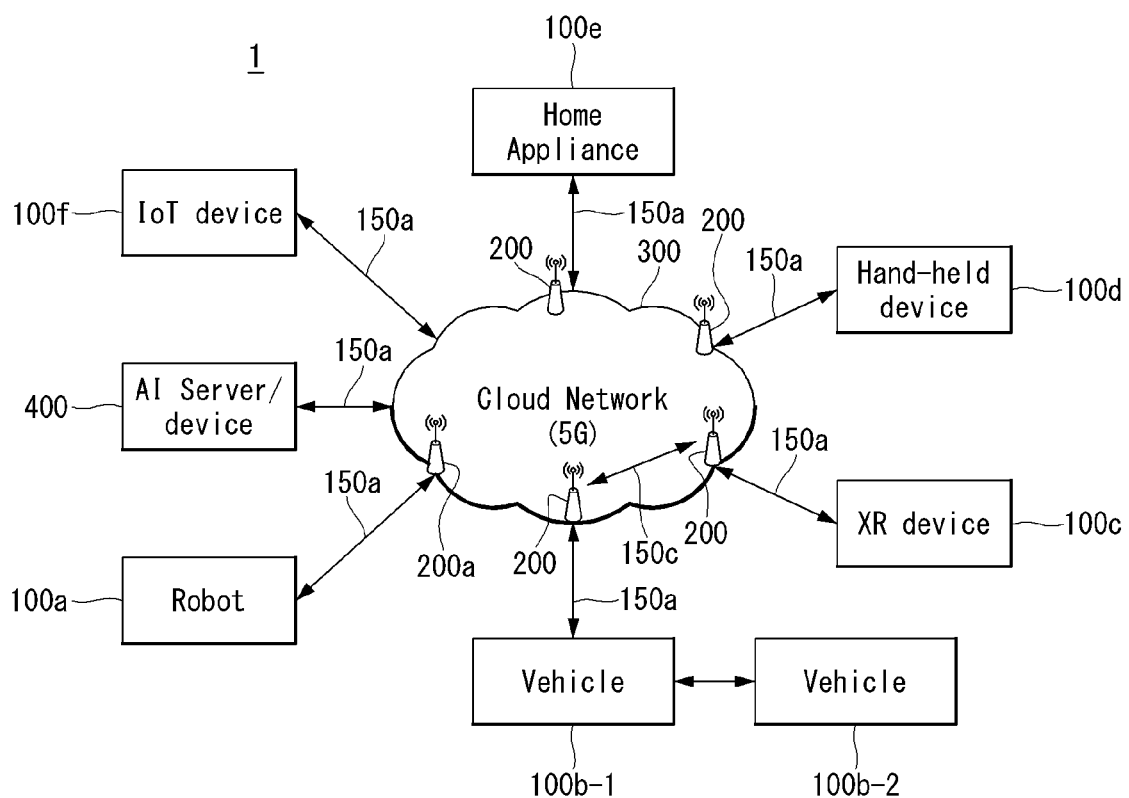

[FIG. 28]
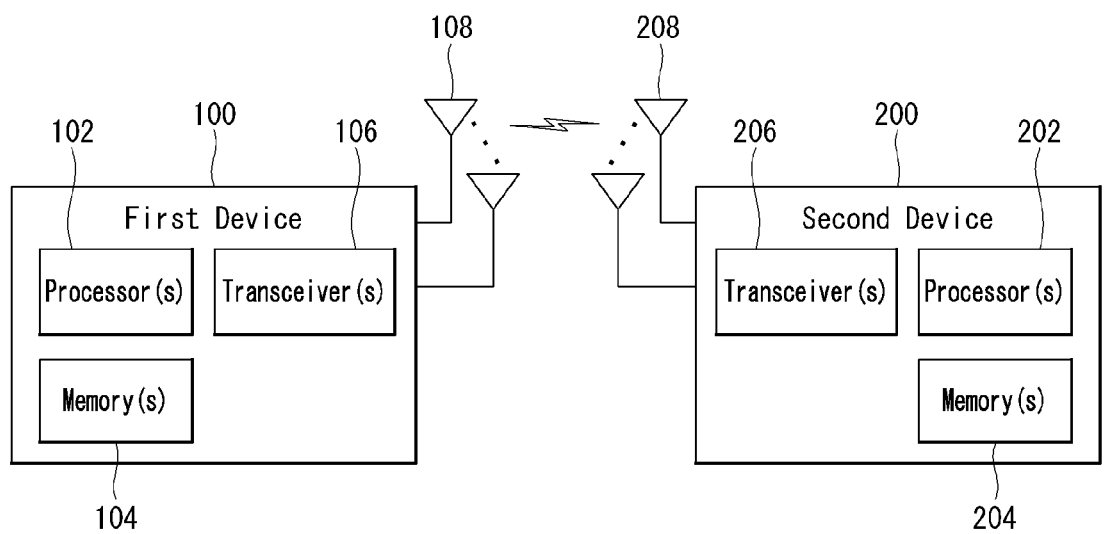

[FIG. 29]
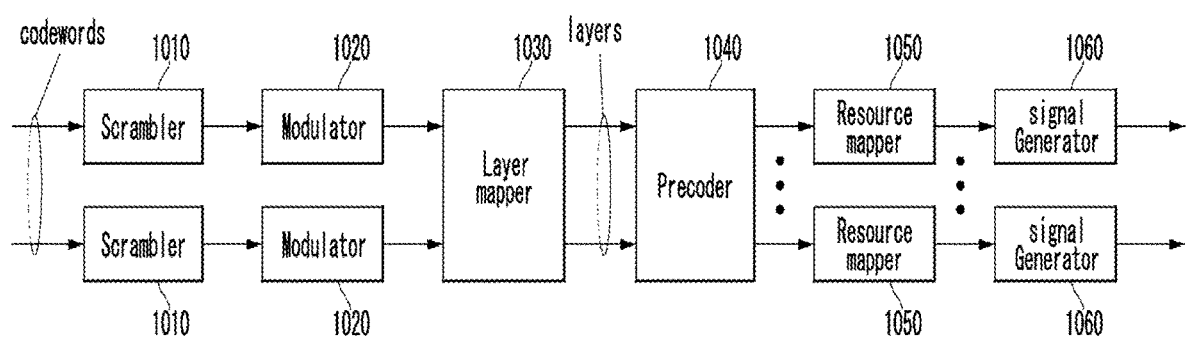

[FIG. 30]
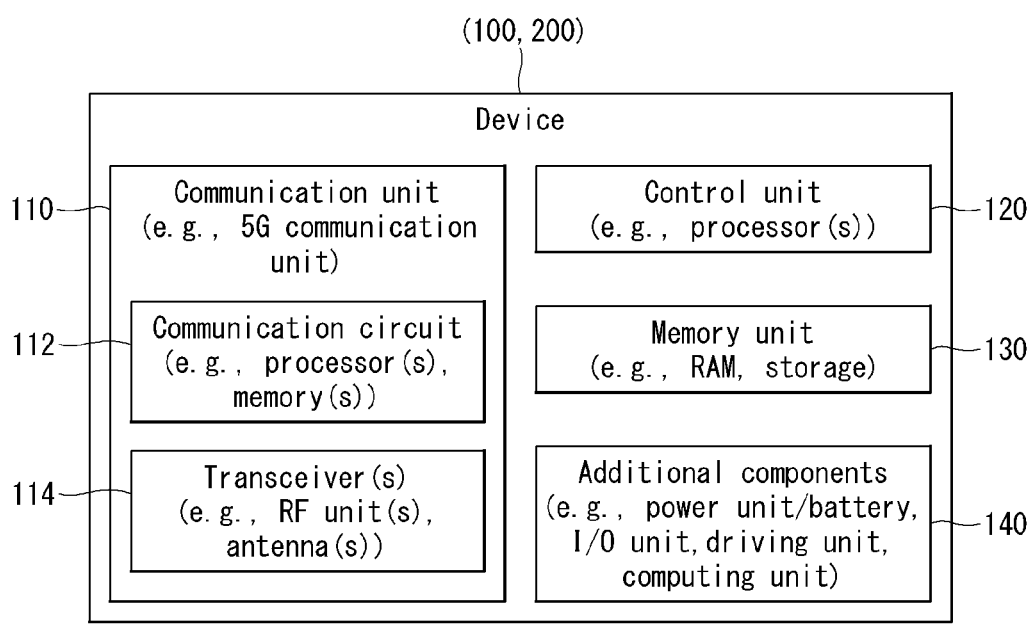

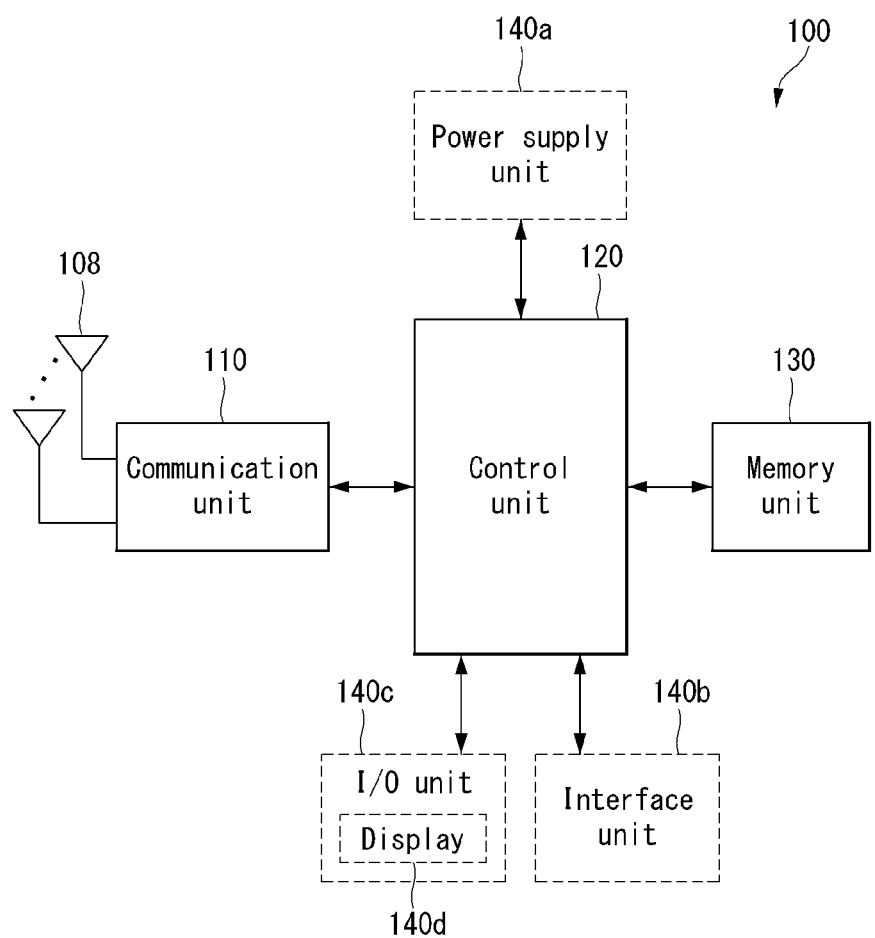
[FIG. 31]

METHOD AND APPARATUS FOR ESTIMATING PHASE NOISE IN WIRELESS COMMUNICATION SYSTEM

CROSS-REFERENCE TO RELATED APPLICATIONS

This application is the National Stage filing under 35 U.S.C. 371 of International Application No. PCT/KR2020/009136, filed on Jul. 10, 2020, the contents of which are all hereby incorporated by reference herein in their entirety.

TECHNICAL FIELD

The present disclosure relates to a method and an apparatus for estimating phase noise in a wireless communication system.

BACKGROUND

A mobile communication system was developed to provide a voice service while ensuring the activity of a user. However, the area of the mobile communication system has extended up to data services in addition to voice. Due to a current explosive increase in traffic, there is a shortage of resources. Accordingly, there is a need for a more advanced mobile communication system because users demand higher speed services.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), the support of a super wideband, and device networking, are researched.

SUMMARY

The present disclosure provides a method and an apparatus for estimating phase noise.

In 5G NR, a method of removing a Common Phase Error (CPE) of a PN using a pilot signal called a Phase Tracking Reference Signal (PTRS) is utilized. The phase noise estimation method using the CPE shows satisfactory performance when a change in phase noise (PN) in one OFDM symbol is small. However, when a change in phase noise in one OFDM symbol increases due to an increase in frequency, the performance of the phase noise estimation method is limited (i.e., the accuracy of phase noise estimation decreases).

To compensate for this, a method for estimating a PN in a form similar to an actual PN value through linear interpolation at the center of a symbol based on a CPE value is being used. However, the above method has problems in that 1) there is a difference between the CPE value and the actual PN value at the center point of the symbol as a reference, and 2) the characteristic of phase noise is not considered because there is no criterion for the interpolation. The performance enhancement of phase noise estimation according to the above method is not significant.

Accordingly, the present disclosure provides a method and an apparatus for estimating a phase noise capable of solving the above-described problems of the prior art.

The technical objects of the present disclosure are not limited to the aforementioned technical objects, and other technical objects, which are not mentioned above, will be apparently appreciated by a person having ordinary skill in the art from the following description.

Technical Solution

A method for estimating a phase noise by a wireless device in a wireless communication system according to an embodiment of the present disclosure includes: receiving a pre-configured pilot signal and a phase tracking reference signal (PTRS); calculating first phase noise based on the pre-configured pilot signal; calculating a common phase error (CPE) based on the phase tracking reference signal (PTRS); and estimating phase noise (PN) based on the first phase noise and the common phase error (CPE).

The PN is estimated through interpolation based on a specific reference point, and the specific reference point is based on the first phase noise and the CPE.

The pre-configured pilot signal may be transmitted in one region of a time region allocated for a cyclic prefix (CP) of the PTRS.

The one region may be positioned at a frontmost portion of the time region allocated for the CP.

The pre-configured pilot signal may be transmitted in a specific time region and the specific time region may be positioned before the time region allocated for the CP of the PTRS.

The first phase noise may be based on a mean of phase noise during a time duration for which the pre-configured pilot signal is transmitted.

At least one time function related to the PN may be determined based on the specific reference point and the first phase noise, and a mean of integral values based on the at least one time function may be equal to the CPE.

The specific reference point may satisfy the following equation, $$PN_m = (q) = 2CPE_{PTRS}(q) - \frac{1}{2}PN_{est}(q) - \frac{1}{2}PN_{est}(q+1)$$

Here, q may represent a symbol index, $PN_m$ may represent the specific reference point, $CPE_{PTRS}$ may represent the CPE, and $PN_{est}$ may represent the first phase noise.

A wireless device for estimating phase noise in a wireless communication system according to another embodiment of the present disclosure includes: one or more transceivers; one or more processors controlling the one or more transceivers; and one or more memories operatively connectable to the one or more processors, and storing instructions of performing operations when the estimation of the phase noise is executed by the one or more processors.

The operations include receiving a pre-configured pilot signal and a phase tracking reference signal (PTRS), calculating first phase noise based on the pre-configured pilot signal, calculating a common phase error (CPE) based on the phase tracking reference signal (PTRS), and estimating phase noise (PN) based on the first phase noise and the common phase error (CPE).

The PN is estimated through interpolation based on a specific reference point, and the specific reference point is based on the first phase noise and the CPE.

The pre-configured pilot signal may be transmitted in one region of a time region allocated for a cyclic prefix (CP) of the PTRS.

The pre-configured pilot signal may be transmitted in a specific time region and the specific time region may be positioned before the time region allocated for the CP of the PTRS.

The first phase noise may be based on a mean of phase noise during a time duration for which the pre-configured pilot signal is transmitted.

At least one time function related to the PN may be determined based on the specific reference point and the first phase noise, and a mean of integral values based on the at least one time function may be equal to the CPE.

The specific reference point may satisfy the following equation, $$PN_m = (q) = 2CPE_{PTRS}(q) - \frac{1}{2}PN_{est}(q) - \frac{1}{2}PN_{est}(q+1)$$

Here, q may represent a symbol index, $PN_m$ may represent the specific reference point, $CPE_{PTRS}$ may represent the CPE, and $PN_{est}$ may represent the first phase noise.

An apparatus according to yet another embodiment of the present disclosure includes: one or more memories and one or more processors functionally connected to the one or more memories.

The one or more processors are configured to control the apparatus to receive a pre-configured pilot signal and a phase tracking reference signal (PTRS), calculate first phase noise based on the pre-configured pilot signal, calculate a common phase error (CPE) based on the phase tracking reference signal (PTRS), and estimate phase noise (PN) based on the first phase noise and the common phase error (CPE).

The PN is estimated through interpolation based on a specific reference point, and the specific reference point is based on the first phase noise and the CPE.

In still yet another aspect, one or more non-transitory computer-readable media store one or more instructions.

The one or more instructions executable by one or more processors are configured to instruct an apparatus to receive a pre-configured pilot signal and a phase tracking reference signal (PTRS), calculate first phase noise based on the pre-configured pilot signal, calculate a common phase error (CPE) based on the phase tracking reference signal (PTRS), and estimate phase noise (PN) based on the first phase noise and the common phase error (CPE).

The PN is estimated through interpolation based on a specific reference point, and the specific reference point is based on the first phase noise and the CPE.

Since the common phase error (CPE) cannot be used as a value representing a PN value at a specific time, the CPE causes many errors as a reference point for interpolation.

According to an embodiment of the present disclosure, a first phase noise is calculated in a time region from a preset pilot signal, and the common phase error (CPE) is calculated from a phase tracking reference signal (PTRS) and phase noise (PN) is estimated through interpolation based on a specific reference point. The specific reference point is based on the first phase noise and the CPE. Therefore, interpolation for estimating phase noise is performed based on the specific reference point that can indicate a PN value at a specific time, so that estimation performance can be further improved.

In order to determine the specific reference point, the preconfigured pilot signal must be transmitted in addition to the phase tracking reference signal (PTRS). According to an embodiment of the present disclosure, the preconfigured pilot signal is transmitted in one region of a time region allocated for a cyclic prefix (CP) of the PTRS, and the one region is positioned at a frontmost portion of the time region allocated for the CP. Therefore, it is possible to minimize InterSymbol Interference (ISI) and system change caused by adding a new pilot to an existing PTRS pilot.

Effects which may be obtained from the present disclosure are not limited by the above effects, and other effects that have not been mentioned may be clearly understood from the above description by those skilled in the art to which the present disclosure pertains.

BRIEF DESCRIPTION OF THE DRAWINGS

FIG. 1 illustrates physical channels and general signal transmission used in a 3GPP system.

FIG. 2 is a view showing an example of a communication structure providable in a 6G system applicable to the present disclosure.

FIG. 3 illustrates a structure of a perceptron to which the method proposed in the present disclosure can be applied.

FIG. 4 illustrates the structure of a multilayer perceptron to which the method proposed in the present disclosure can be applied.

FIG. 5 illustrates a structure of a deep neural network to which the method proposed in the present disclosure can be applied.

FIG. 6 illustrates the structure of a convolutional neural network to which the method proposed in the present disclosure can be applied.

FIG. 7 illustrates a filter operation in a convolutional neural network to which the method proposed in the present disclosure can be applied.

FIG. 8 illustrates a neural network structure in which a circular loop to which the method proposed in the present disclosure can be applied.

FIG. 9 illustrates an operation structure of a recurrent neural network to which the method proposed in the present disclosure can be applied.

FIG. 10 is a view showing an electromagnetic spectrum applicable to the present disclosure.

FIG. 11 is a view showing a THz communication method applicable to the present disclosure.

FIG. 12 is a view showing a THz wireless communication transceiver applicable to the present disclosure.

FIG. 13 is a view showing a THz signal generation method applicable to the present disclosure.

FIG. 14 is a view showing a wireless communication transceiver applicable to the present disclosure.

FIG. 15 is a view showing a transmitter structure based on a photonic source applicable to the present disclosure.

FIG. 16 is a view showing an optical modulator structure applicable to the present disclosure.

FIG. 17 is a flowchart illustrating an example of a DL PTRS procedure.

FIG. 18 is a graph for describing estimation of a phase noise using a common phase error (CPE) according to the prior art.

FIG. 19 is a view for explaining a pilot structure according to an embodiment of the present disclosure by comparing with a conventional scheme.

FIG. 20 illustrates a structure of a pilot according to an embodiment of the present disclosure.

FIG. 21 is a block diagram for describing a method for estimating a phase noise according to an embodiment of the present disclosure.

FIG. 22 is a graph for describing a reference point of interpolation performed for estimation of a phase noise according to an embodiment of the present disclosure.

FIG. 23 is a diagram for describing the performance of phase noise estimation according to the method proposed in the present disclosure by comparing with the prior art.

FIGS. 24 and 25 are diagrams for describing a block error rate (BER) when the method proposed in the present disclosure is applied by comparing with the conventional scheme.

FIG. 26 is a flowchart for describing a method for estimating, by a wireless device, a phase noise in a wireless communication system according to an embodiment of the present disclosure.

FIG. 27 illustrates a communication system 1 applied to the present disclosure.

FIG. 28 illustrates wireless devices applicable to the present disclosure.

FIG. 29 illustrates a signal process circuit for a transmission signal applied to the present disclosure.

FIG. 30 illustrates another example of a wireless device applied to the present disclosure.

FIG. 31 illustrates a hand-held device applied to the present disclosure.

DETAILED DESCRIPTION

Hereinafter, embodiments disclosed in the present disclosure will be described in detail with reference to the accompanying drawings, but the same or similar components are denoted by the same and similar reference numerals, and redundant descriptions thereof will be omitted. The suffixes "module" and "unit" for components used in the following description are given or used interchangeably in consideration of only the ease of preparation of the specification, and do not have meanings or roles that are distinguished from each other by themselves. In addition, in describing the embodiments disclosed in the present disclosure, when it is determined that a detailed description of related known technologies may obscure the subject matter of the embodiments disclosed in the present disclosure, the detailed description thereof will be omitted. In addition, the accompanying drawings are for easy understanding of the embodiments disclosed in the present disclosure, and the technical idea disclosed in the present disclosure is not limited by the accompanying drawings, and all modifications included in the spirit and scope of the present disclosure, It should be understood to include equivalents or substitutes.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or generation NB (general NB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

For clarity, the description is based on a 3GPP communication system (eg, LTE, NR, etc.), but the technical idea of the present disclosure is not limited thereto. LTE refers to the technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP NR refers to the technology after TS 38.xxx Release 15. 3GPP 6G may mean technology after TS Release 17 and/or Release 18. "xxx" means standard document detail number. LTE/NR/6G may be collectively referred to as a 3GPP system. Background art, terms, abbreviations, and the like used in the description of the present disclosure may refer to matters described in standard documents published before the present disclosure. For example, you can refer to the following document:

3GPP LTE 36.211: Physical channels and modulation 36.212: Multiplexing and channel coding 36.213: Physical layer procedures 36.300: Overall description 36.331: Radio Resource Control (RRC)

3GPP NR 38.211: Physical channels and modulation 38.212: Multiplexing and channel coding 38.213: Physical layer procedures for control 38.214: Physical layer procedures for data
38.300: NR and NG-RAN Overall Description
38.331: Radio Resource Control (RRC) protocol specification Physical Channel and Frame Structure Physical Channels and General Signal Transmission FIG. 1 illustrates physical channels and general signal transmission used in a 3GPP system. In a wireless communication system, a terminal receives information from a base station through a downlink (DL), and the terminal transmits information to the base station through an uplink (UL). The information transmitted and received by the base station and the terminal includes data and various control information, and various physical channels exist according to the type/use of information transmitted and received by them.

When the terminal is powered on or newly enters a cell, the terminal performs an initial cell search operation such as synchronizing with the base station (S101). To this end, the UE receives a Primary Synchronization Signal (PSS) and a Secondary Synchronization Signal (SSS) from the base station to synchronize with the base station and obtain information such as cell ID. Thereafter, the terminal may receive a physical broadcast channel (PBCH) from the base station to obtain intra-cell broadcast information. Meanwhile, the UE may receive a downlink reference signal (DL RS) in the initial cell search step to check a downlink channel state.

After completing the initial cell search, the UE receives a physical downlink control channel (PDCCH) and a physical downlink shared channel (PDSCH) according to the information carried on the PDCCH, thereby receiving a more specific system Information can be obtained (S102).

On the other hand, when accessing the base station for the first time or when there is no radio resource for signal transmission, the terminal may perform a random access procedure (RACH) for the base station (S103 to S106). To this end, the UE transmits a specific sequence as a preamble through a physical random access channel (PRACH) (S103 and S105), and a response message to the preamble through a PDCCH and a corresponding PDSCH (RAR (Random Access Response) message) In the case of contention-based RACH, a contention resolution procedure may be additionally performed (S106).

After performing the above-described procedure, the UE receives PDCCH/PDSCH (S107) and physical uplink shared channel (PUSCH)/physical uplink control channel as a general uplink/downlink signal transmission procedure. (Physical Uplink Control Channel; PUCCH) transmission (S108) can be performed. In particular, the terminal may receive downlink control information (DCI) through the PDCCH. Here, the DCI includes control information such as resource allocation information for the terminal, and different formats may be applied according to the purpose of use.

On the other hand, control information transmitted by the terminal to the base station through uplink or received by the terminal from the base station is a downlink/uplink ACK/NACK signal, a channel quality indicator (CQI), a precoding matrix index (PMI), and (Rank Indicator) may be included. The terminal may transmit control information such as CQI/PMI/RI described above through PUSCH and/or PUCCH.

Structure of Uplink and Downlink Channels

Downlink Channel Structure

The base station transmits a related signal to the terminal through a downlink channel to be described later, and the terminal receives a related signal from the base station through a downlink channel to be described later.

(1) Physical Downlink Shared Channel (PDSCH)

PDSCH carries downlink data (eg, DL-shared channel transport block, DL-SCH TB), and includes Quadrature Phase Shift Keying (QPSK), Quadrature Amplitude Modulation (QAM), 64 QAM, 256 QAM, etc. The modulation method is applied. A codeword is generated by encoding TB. The PDSCH can carry multiple codewords. Scrambling and modulation mapping are performed for each codeword, and modulation symbols generated from each codeword are mapped to one or more layers (Layer mapping). Each layer is mapped to a resource together with a demodulation reference signal (DMRS) to generate an OFDM symbol signal, and is transmitted through a corresponding antenna port.

(2) Physical Downlink Control Channel (PDCCH)

The PDCCH carries downlink control information (DCI) and a QPSK modulation method is applied. One PDCCH is composed of 1, 2, 4, 8, 16 Control Channel Elements (CCEs) according to the Aggregation Level (AL). One CCE consists of 6 REGs (Resource Element Group). One REG is defined by one OFDM symbol and one (P)RB.

The UE acquires DCI transmitted through the PDCCH by performing decoding (aka, blind decoding) on the set of PDCCH candidates. The set of PDCCH candidates decoded by the UE is defined as a PDCCH search space set. The search space set may be a common search space or a UE-specific search space. The UE may acquire DCI by monitoring PDCCH candidates in one or more search space sets set by MIB or higher layer signaling.

Uplink Channel Structure

The terminal transmits a related signal to the base station through an uplink channel to be described later, and the base station receives a related signal from the terminal through an uplink channel to be described later.

(1) Physical Uplink Shared Channel (PUSCH)

PUSCH carries uplink data (eg, UL-shared channel transport block, UL-SCH TB) and/or uplink control information (UCI), and CP-OFDM (Cyclic Prefix-Orthogonal Frequency Division Multiplexing) waveform (waveform), DFT-s-OFDM (Discrete Fourier Transform-spread-Orthogonal Frequency Division Multiplexing) is transmitted based on the waveform. When the PUSCH is transmitted based on the DFT-s-OFDM waveform, the UE transmits the PUSCH by applying transform precoding. For example, when transform precoding is not possible (eg, transform precoding is disabled), the UE transmits a PUSCH based on the CP-OFDM waveform, and when transform precoding is possible (eg, transform precoding is enabled), the UE is CP-OFDM. PUSCH may be transmitted based on a waveform or a DFT-s-OFDM waveform. PUSCH transmission is dynamically scheduled by the UL grant in the DCI or is semi-static based on higher layer (e.g., RRC) signaling (and/or Layer 1 (L1) signaling (e.g., PDCCH)). Can be scheduled (configured grant). PUSCH transmission may be performed based on a codebook or a non-codebook.

(2) Physical Uplink Control Channel (PUCCH)

The PUCCH carries uplink control information, HARQ-ACK, and/or scheduling request (SR), and may be divided into a plurality of PUCCHs according to the PUCCH transmission length.

6G System General

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 1 below. That is, Table 1 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite Integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

FIG. 2 is a view showing an example of a communication structure providable in a 6G system applicable to the present disclosure.

Referring to FIG. 2, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Core Implementation Technology of 6G System
Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting several perceptrons.

FIG. 3 illustrates a structure of a perceptron to which the method proposed in the present disclosure can be applied.

Referring to FIG. 3, when an input vector x=(x1, x2, ... , xd) is input, each component is multiplied by a weight (W1, W2, ..., Wd), and all the results are summed. After that, the entire process of applying the activation function $\sigma(\cdot)$ is called a perceptron. The huge artificial neural network structure may extend the simplified perceptron structure shown in FIG. 3 to apply input vectors to different multi-dimensional perceptrons. For convenience of explanation, an input value or an output value is referred to as a node.

Meanwhile, the perceptron structure illustrated in FIG. 3 may be described as being composed of a total of three layers based on an input value and an output value. An artificial neural network in which H (d+1) dimensional perceptrons exist between the 1st layer and the 2nd layer, and K (H+1) dimensional perceptrons exist between the 2nd layer and the 3rd layer, as shown in FIG. 4.

FIG. 4 illustrates the structure of a multilayer perceptron to which the method proposed in the present disclosure can be applied.

The layer where the input vector is located is called an input layer, the layer where the final output value is located is called the output layer, and all layers located between the input layer and the output layer are called a hidden layer. In the example of FIG. 4, three layers are disclosed, but since the number of layers of the artificial neural network is counted excluding the input layer, it can be viewed as a total of two layers. The artificial neural network is constructed by connecting the perceptrons of the basic blocks in two dimensions.

The above-described input layer, hidden layer, and output layer can be jointly applied in various artificial neural network structures such as CNN and RNN to be described later as well as multilayer perceptrons. The greater the number of hidden layers, the deeper the artificial neural network is, and the machine learning paradigm that uses the deep enough artificial neural network as a learning model is called Deep Learning. In addition, the artificial neural network used for deep learning is called a deep neural network (DNN).

FIG. 5 illustrates a structure of a deep neural network to which the method proposed in the present disclosure can be applied.

The deep neural network shown in FIG. 5 is a multilayer perceptron composed of eight hidden layers+output layers. The multilayer perceptron structure is expressed as a fully-connected neural network. In a fully connected neural network, a connection relationship does not exist between nodes located on the same layer, and a connection relationship exists only between nodes located on adjacent layers. DNN has a fully connected neural network structure and is composed of a combination of multiple hidden layers and activation functions, so it can be usefully applied to understand the correlation characteristics between input and output. Here, the correlation characteristic may mean a joint probability of input/output.

'On the other hand, depending on how the plurality of perceptrons are connected to each other, various artificial neural network structures different from the aforementioned DNN can be formed.

In a DNN, nodes located inside one layer are arranged in a one-dimensional vertical direction. However, in FIG. 6, it may be assumed that w nodes are arranged in two dimensions, and h nodes are arranged in a two-dimensional manner (convolutional neural network structure of FIG. 6). In this case, since a weight is added per connection in the connection process from one input node to the hidden layer, a total of h×w weights must be considered. Since there are h×w nodes in the input layer, a total of h2w2 weights are required between two adjacent layers.

FIG. 6 illustrates the structure of a convolutional neural network to which the method proposed in the present disclosure can be applied.

The convolutional neural network of FIG. 6 has a problem in that the number of weights increases exponentially according to the number of connections, so instead of considering the connection of all modes between adjacent layers, it is assumed that a filter having a small size exists. Thus, as shown in FIG. 7, weighted sum and activation function calculations are performed on a portion where the filters overlap.

One filter has a weight corresponding to the number as much as the size, and learning of the weight may be performed so that a certain feature on an image can be extracted and output as a factor. In FIG. 7, a filter having a size of 3×3 is applied to the upper leftmost 3×3 area of the input layer, and an output value obtained by performing a weighted sum and activation function operation for a corresponding node is stored in z22.

While scanning the input layer, the filter performs weighted summation and activation function calculation while moving horizontally and vertically by a predetermined interval, and places the output value at the position of the current filter. This method of operation is similar to the convolution operation on images in the field of computer vision, so a deep neural network with this structure is called a convolutional neural network (CNN), and a hidden layer generated as a result of the convolution operation. Is referred to as a convolutional layer. In addition, a neural network in which a plurality of convolutional layers exists is referred to as a deep convolutional neural network (DCNN).

FIG. 7 illustrates a filter operation in a convolutional neural network to which the method proposed in the present disclosure can be applied.

In the convolutional layer, the number of weights may be reduced by calculating a weighted sum by including only nodes located in a region covered by the filter in the node where the current filter is located. Due to this, one filter can be used to focus on features for the local area. Accordingly, the CNN can be effectively applied to image data processing in which the physical distance in the 2D area is an important criterion. Meanwhile, in the CNN, a plurality of filters may be applied immediately before the convolution layer, and a plurality of output results may be generated through a convolution operation of each filter.

Meanwhile, there may be data whose sequence characteristics are important according to data properties. Considering the length variability of the sequence data and the relationship between the sequence data, one element in the data sequence is input at each timestep, and the output vector (hidden vector) of the hidden layer output at a specific time point is input together with the next element in the sequence. The structure applied to the artificial neural network is called a recurrent neural network structure.

FIG. 8 illustrates a neural network structure in which a circular loop to which the method proposed in the present disclosure can be applied.

Referring to FIG. 8, a recurrent neural network (RNN) is a fully connected neural network with elements (x1 (t), x2(t), . . . , xd(t)) of any line of sight t on a data sequence. In the process of inputting, the point t−1 immediately preceding is the weighted sum and activation function by inputting the hidden vectors (z1(t−1), z2(t−1), . . . , zH(t−1)) together. It is a structure to be applied. The reason for transferring the hidden vector to the next view in this way is that information in the input vector at the previous views is regarded as accumulated in the hidden vector of the current view.

FIG. 9 illustrates an operation structure of a recurrent neural network to which the method proposed in the present disclosure can be applied.

Referring to FIG. 9, the recurrent neural network operates in a predetermined order of time with respect to an input data sequence.

Hidden vectors (z1(1), z2(1), . . . , zH(1)) is input with the input vector (x1(2), x2(2), . . . , xd(2)) of the time point 2, and the vector (z1(2), z2(2), . . . , zH(2)) is determined. This process is repeatedly performed up to the time point 2, time point 3, . . . , time point T.

Meanwhile, when a plurality of hidden layers are disposed in a recurrent neural network, this is referred to as a deep recurrent neural network (DRNN). The recurrent neural network is designed to be usefully applied to sequence data (for example, natural language processing).

As a neural network core used as a learning method, in addition to DNN, CNN, and RNN, Restricted Boltzmann Machine (RBM), deep belief networks (DBN), and deep Q-networks Network), and can be applied to fields such as computer vision, speech recognition, natural language processing, and voice/signal processing.

In recent years, attempts to integrate AI with a wireless communication system have appeared, but this has been concentrated in the field of wireless resource management and allocation in the application layer, network layer, in particular, deep learning. However, such research is gradually developing into the MAC layer and the physical layer, and in particular, attempts to combine deep learning with wireless transmission in the physical layer have appeared. The AI-based physical layer transmission refers to applying a signal processing and communication mechanism based on an AI driver rather than a traditional communication framework in the fundamental signal processing and communication mechanism. For example, deep learning-based channel coding and decoding, deep learning-based signal estimation and detection, deep learning-based MIMO mechanism, AI-based resource scheduling, and It may include allocation and the like.

Terahertz (THz) Communication

THz communication is applicable to the 6G system. For example, a data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

Terahertz (THz) Wireless Communications in General

THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence. In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

FIG. 11 is a view showing a THz communication method applicable to the present disclosure.

Referring to FIG. 11, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading.

Table 2 below shows an example of technology which may be used in the THz wave.

TABLE 2

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

THz wireless communication can be classified based on a method for generating and receiving THz. The THz generation method can be classified as an optical device or an electronic device-based technology.

FIG. 12 is a view showing a THz wireless communication transceiver applicable to the present disclosure.

The method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 18, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 18. In FIG. 18, IF represents an intermediate frequency, a tripler and a multiplier represents a multiplier, PA represents a power amplifier, and LNA represents a low noise amplifier, and PLL represents a phase-locked loop.

FIG. 13 is a view showing a THz signal generation method applicable to the present disclosure and FIG. 14 is a view showing a wireless communication transceiver applicable to the present disclosure.

Referring to FIGS. 13 and 14, the optical device-based THz wireless communication technology means a method of generating and modulating a THz signal using an optical device. The optical device-based THz signal generation technology refers to a technology that generates an ultra-high-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 13, a laser diode, a broadband optical modulator, and an ultrahigh-speed photodetector are required. In the case of FIG. 13, the light signals of two lasers having different wavelengths are combined to generate a THz signal corresponding to a wavelength difference between the lasers. In FIG. 13, an optical coupler refers to a semiconductor device that transmits an electrical signal using light waves to provide coupling with electrical isolation between circuits or systems, and a uni-travelling carrier photodetector (UTC-PD) is one of photo-detectors, which uses electrons as an active carrier and reduces the travel time of electrons by bandgap grading. The UTC-PD is capable of photodetection at 150 GHz or more. In FIG. 14, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

The structure of a photoelectric converter (or photoelectric converter) will be described with reference to FIGS. 15 and 16. FIG. 15 is a view showing a transmitter structure based on a photonic source applicable to the present disclosure. FIG. 16 is a view showing an optical modulator structure applicable to the present disclosure.

generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation $10^2$ dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

Phase Tracking Reference Signal (PTRS)

In the case of mmWave, since an influence of phase noise is large due to damaged to RF hardware, a transmitted or received signal is distorted in a time domain.

The phase noise causes common phase error (CPE) and inter-carrier interference (ICI) in the frequency domain.

In particular, compensation of oscillator phase noise is enabled in a high carrier frequency, and the same phase rotation for all subcarriers occurs by the phase noise. Accordingly, the PTRS is defined in the NR in order to estimate and compensate the CPE.

Hereinafter, a DL PTRS related operation will be described.

FIG. 17 is a flowchart illustrating an example of a DL PTRS procedure.

Referring to FIG. 17, the BS transmits, to the UE, PTRS configuration information (S1710).

The PTRS configuration information may refer to PTRS-DownlinkConfig IE.

The PTRS-DownlinkConfig IE may include parameter frequencyDensity, parameter timeDensity, parameter epre-Ratio, parameter resourceElementOffset, etc.

The parameter frequencyDensity as a function of scheduled BW is a parameter representing presence and a frequency density of DL PTRS.

The parameter timeDensity as a function of modulation and coding scheme (MCS) is a parameter representing the presence and a time density of DL PTRS.

The parameter epre-Ratio is a parameter representing energy per resource element between the PTRS and the PDSCH.

Next, the BS generates a sequence used for the PTRS (S1720).

The sequence for the PTRS is generated a DMRS sequence of the same subcarrier as shown in Equation 4.1C-3 below.

Sequence generation for the PTRS may be defined differently according to whether the transform precoding is enabled and Equation 4.1C-3 shows an example when the transform precoding is disabled.

$$r_k = r(2m+k') \quad \text{[Equation 1]}$$

Here, r(2m+k') is a DMRS given at location $l_0$ and subcarrier k.

That is, the sequence of the PTRS uses the sequence of the DMRS, but more specifically, the sequence of the PTRS in subcarrier k is the same as the sequence of the DMRS in subcarrier k.

Next, the BS maps the generated sequence to a resource element (S1730).

Here, the resource element may include at least one of a time, a frequency, an antenna port, or a code.

The position in the time domain of the PTRS is mapped at a specific symbol interval starting from a start symbol of PDSCH allocation, but when there is the DMRS symbol, mapping is performed from a next symbol of the corresponding DMRS symbol. The specific symbol interval may be 1, 2, or 4 symbols.

In addition, in relation to resource element mapping of the PTRS, a frequency position of the PTRS is determined by a frequency position of an associated DMRS port and higher layer parameter UL-PTRS-RE-offset.

Here, the UL-PTRS-RE-offset is included in a PTRS configuration, and indicates a subcarrier offset for UL PTRS for CP-OFDM.

For DL, a PTRS port is associated with a DMRS port having a lowest index between scheduled DMRS ports.

In addition, for UL, the BS configures which DMRS port is associated with the PTRS port through the UL DCI Next, the BS transmits, to the UE, the PTRS on the resource element (S1740). The UE performs compensation for the phase noise by using the received PTRS.

Hereinafter, a UL PTRS related operation will be described.

A UL PTRS related operation is similar to the UL PTRS related operation described above, and names of the parameters related to DL may be replaced with the names of parameters related to UL.

That is, PTRS-DownlinkConfig IE may be replaced with PTRS-UplinkConfig IE, and the DL PTRS related operation, the BS may be replaced with the UE and the UE may be replaced with the BS.

Similarly, sequence generation for the PTRS may be defined differently according to whether transform decoding is enabled.

The aforementioned contents may be combined with subsequent embodiments proposed in the present disclosure and applied or may be supplemented to clarify technical characteristics of the embodiments proposed in the present disclosure. Hereinafter, the embodiments to be described hereinafter have been divided for convenience of description only, and some elements of any one embodiment may be substituted with some elements of another embodiment or may be mutually combined and applied.

Compared to the existing LTE mobile communication, 5G mobile communication increases the influence of phase noise (PN) as the center frequency rises to the mmWave band. Since an increase in phase noise results in a decrease in the achievable Signal Noise to Ratio (SINR) of the signal, the maximum capacity of the entire system is limited. In LTE, the phase noise is large enough not to affect communication, but as the center frequency increases to the mmWave band, the phase noise increases to a size large enough to affect communication, and compensation is required.

In this regard, in 5G NR, a method for removing a Common Phase Error (CPE) of a PN using a pilot signal called a Phase Tracking Reference Signal (PTRS) is utilized.

The present disclosure proposes a method for controlling the phase noise (PN) more effectively than a conventional method for removing the phase noise based on the PTRS. First, the problems of the conventional scheme are described.

The CPE estimation based on the existing PTRS is performed as follows. Specifically, a mean value of PNs affecting an OFDM symbol is measured using the pilot of the frequency domain. Hereinafter, the estimation of the phase noise will be described with reference to FIG. 18.

FIG. 18 is a graph for describing estimation of a phase noise using a common phase error (CPE) according to the prior art. Referring to FIG. 18, the CPE represents the mean of PN integral values. The phase noise estimation method using the CPE shows satisfactory performance when a change in phase noise (PN) in one OFDM symbol is small.

However, when a change in phase noise in one OFDM symbol increases due to an increase in frequency, the performance of the phase noise estimation method is limited (i.e., the accuracy of phase noise estimation decreases).

The difference between the actual PN value (①) and the compensated CPE value (②) acts as InterSymbol Interference (ISI), reducing the achievable SINR of the signal. In a high PN Power Spectrum Density (PSD) situation, since the difference (i.e., the difference between ① and ②) becomes larger, the phase noise estimation performance is greatly deteriorated.

To overcome this problem, an interpolation method is proposed. The PN may be estimated in a form similar to an actual PN value through linear interpolation at the center of a symbol based on a CPE value (③).

This method has two problems. First, there is a difference between the CPE value and the actual PN value at the central point of the symbol as a reference. Second, there is no reference for interpolation. As such, since the characteristics of an actual PN are not considered at all, performance enhancement of phase noise estimation through interpolation is not large.

As reviewed above, an object of the present disclosure is to improve the performance of an interpolation-based PN compensation scheme using the PTRS.

Hereinafter, two methods are proposed to maximize the performance of interpolation-based PN compensation using the existing PTRS.

First, since the length of an OFDM symbol is long, it is difficult to use the CPE, which is the man value of the phase noise of symbols, as a value representing a PN value at a specific time. That is, the CPE value which becomes the existing interpolation reference does not indicate the value of the PN at the center of the actual symbol. To solve this problem, a pilot transmitted in a very short time region compared to the OFDM symbol is used. An accurate PN value may be measured at a specific time based on the pilot. The interpolation may be performed based on the measured PN value.

After performing the second conventional interpolation method, the mean value of the integral of PN, which is a basic property of the estimated PN, is not equal to the value of CPE, resulting in an error in estimating the phase noise. In order to make the estimated PN value after interpolation the same as the CPE value of the existing PN, a new interpolation method is presented.

Through the above two methods, higher performance may be obtained than the interpolation method using the existing CPE. In the present disclosure, the CPE of the PN is estimated in the frequency domain and the time domain in one symbol, and in order to estimate the CPE in the frequency domain, a PTRS-based pilot configuration is used, and in order to estimate the CPE in the time domain, a known pilot is used.

FIG. 19 is a view for explaining a pilot structure according to an embodiment of the present disclosure by comparing with a conventional scheme. (a) of FIG. 19 and (c) of FIG. 19 illustrate a pilot structure based on the prior art, and (b) of FIG. 19 and (d) of FIG. 19 illustrate a pilot structure based on an embodiment of the present disclosure.

Referring to (a) of FIG. 19, in the existing PTRS-based pilot structure, a PTRS pilot is inserted at a specific location in the frequency domain. The conventional method estimates the CPE of the OFDM symbol using the PTRS pilot.

Referring to (c) of FIG. 19, the method according to the embodiment of the present disclosure inserts a part of a PTRS pilot into a PN pilot in the time domain. That is, the method according to the embodiment of the present disclosure utilizes two pilots. Specifically, the PTRS pilot is used for calculating the CPE in the frequency domain, and the PN pilot is used for calculating the PN in the time domain.

Hereinafter, for convenience of description, a PN value calculated based on the PN pilot may be referred to as first phase noise representing a PN value at a specific time. The term is used to differentiate from the finally estimated phase noise, and is not used to limit the technical scope.

FIG. 20 illustrates a structure of a pilot according to an embodiment of the present disclosure.

(a) of FIG. 20 illustrates a pilot structure according to a conventional method.

(b) of FIG. 20 illustrates a pilot structure according to method 1 in an embodiment of the present disclosure. According to method 1, instead of removing P PTRS pilots in the frequency domain, P PN pilots are inserted in the time domain. Here, if the PN pilot is placed after a Cyclic Prefix (CP), inter-symbol interference (ISI) may be caused to the corresponding symbol, so the PN pilot is placed before the CP. In this case, the overall symbol length is increased, but the total throughput may be maintained.

Method 1 has a disadvantage in that system change (i.e., frame structure change) is required because the length of the OFDM symbol is changed. In order to overcome the disadvantage of Method 1, Method 2 according to an embodiment of the present disclosure may be considered.

Referring to (c) of FIG. 20, in method 2, a part of the CP is replaced with the PN pilot. More specifically, the frontmost part of the CP may be replaced with the PN pilot. In the case of CP, since the length of the CP it is set larger than the maximum channel length, there is very little possibility of inter-symbol interference even when a shorter PN pilot is inserted than the CP length. In addition, even if the inter-symbol interference occurs, if the channel and PN values may be known, the interference may be removed through additional baseband processing.

In the case of the method 2, although a slight deterioration of signal quality or additional complexity according to signal processing may be caused, there is an advantage of maintaining the conventional frame structure.

Hereinafter, a method for estimating phase noise (PN) according to an embodiment of the present disclosure will be described.

FIG. 21 is a block diagram for describing a method for estimating a phase noise according to an embodiment of the present disclosure.

Referring to FIG. 21, a PN value may be calculated using a PN pilot (known pilot) in the time domain, and a mean value obtained by integrating the corresponding value may be estimated as the CPE (Estimate PN pilot CPE). In the frequency domain, the CPE may be estimated based on the PTRS pilot (Estimate PTRS CPE). The PN is estimated based on interpolation using the CPE values.

Hereinafter, a method first estimating the first phase noise based on the PN pilot will be described in detail.

Estimation of the first phase noise in the time domain may be performed based on Equations 2 and 3 below.

$$y_{pilot}(t) = e^{jPN(t)} P_{pilot}(t) \quad \text{[Equation 2]}$$

In Equation 2, $y_{pilot}(t)$ represents a signal received by the wireless device (e.g., UE/BS). The received signal is expressed in the form of a multiplication of a transmitted PN pilot signal $P_{pilot}(t)$ and PN(t) which is the PN in the time domain.

$PN_{est}(q)$ which is a PN value (i.e., a first phase noise) estimated in the time domain in a qth symbol may be expressed as in Equation 3 below.

$$PN_{est}(q) = \frac{1}{P} \sum_{t=0}^{N_{time}-1} L \frac{y_{pilot}(t)}{P_{pilot}(t)} = \frac{1}{N_{time}} \sum_{N=0}^{N_{time}-1} [PN(t)] \quad \text{[Equation 3]}$$

In Equation 3 above, $N_{time}$ represents the length of the PN pilot and P represents the number of PN pilots. Referring to Equation 3 above, $PN_{est}(q)$ may be estimated by a mean value of PN(t) of the time domain. This is a method similar to the estimation of the CPE calculated in the frequency domain by using the PTRS pilot, but the CPE is estimated in a short pilot time, so an actual PN value of a time domain pilot interval may be represented.

The CPE estimation in the frequency domain utilizing the PTRS pilot in the qth symbol may be performed based on Equation 4 below.

$$CPE_{PTRS}(q) = L \frac{1}{N_{PTRS}} \sum_{n=0}^{N_{PTRS}-1} \frac{Y[p(n)]}{H[p(n)]P_{pilot}[n]}, \quad \text{[Equation 4]}$$

$p(n) = PTRS$ pilot subcarrier index

Here, Y[p(n)] represents a received signal according to H[p(n)] represents a channel according to p(n), $N_{PTRS}$ represents the number of PTRS pilots, p(n) represents a subcarrier index of an nth PTRS pilot, $P_{pilot}[n]$ and represents an nth PTRS pilot.

Hereinafter, matters related to selection of an interpolation reference for phase noise estimation will be described.

FIG. 22 is a graph for describing a reference point of interpolation performed for estimation of a phase noise according to an embodiment of the present disclosure.

Referring to FIG. 22, the mean of integral values of the PN is equal to the CPE value. In the case of using the conventional interpolation method, the integral value (mean of) of the estimated PN values is not equal to the CPE value.

To solve this problem, the phase estimation method according to an embodiment of the present disclosure proposes the use of a new reference point.

According to an embodiment, the new reference point may be based on the first phase noise calculated in the time domain and the CPE calculated in the frequency domain. Specifically, the new reference point may be based on the first phase noise and the CPE.

In this case, the first phase noise may include values calculated for the current symbol and the next symbol. Specifically, the first phase noise may include a $PN_{est}(q)$ value of a current symbol (symbol index q) and a $PN_{est}(q+1)$ value of a next symbol (symbol index q+1).

In FIG. 22, the new reference point is $PN_m$, and, a straight line of $PN_{est}(q)$ and $PN_m$ is expressed as PN1(t), and a straight line of $PN_m$ and $PN_{est}(q+1)$ is expressed as PN2(t). As a result, $CPE_{PTRS}(q)$ which is the CPE value of the current symbol (symbol index q) may be expressed as in Equation 5 below.

$$\frac{1}{N}\left(\int_0^{\frac{N}{2}} PN1(t)dt + \int_{\frac{N}{2}}^{N} PN2(t)dt\right) = CPE_{PTRS}(q) \quad \text{[Equation 5]}$$

$PN_m(q)$ which is the new reference point of the interpolation may be expressed as in Equation 5 above and Equation 6 below by using $PN_{est}(q)$ and $PN_{est}(q+1)$.

$$PN_m(q) = 2CPE_{PTRS}(q) - \frac{1}{2}PN_{est}(q) - \frac{1}{2}PN_{est}(q+1) \quad \text{[Equation 6]}$$

The phase noise PN in the time domain estimated through the interpolation based on the $PN_m(q)$ may be expressed as in Equation 7 below.

$$\widehat{PN}(t) = \quad \text{[Equation 7]}$$
$$\begin{bmatrix} PN1(t) = \frac{2}{N}(PN_m(q) - PN_{est}(q))t + PN_{est}(q), \\ t = (q-1)N \sim (q-1)N + \frac{N}{2} \\ PN2(t) = \frac{2}{N}(PN_{est}(q+1) - PN_m(q))\left(t - \frac{N}{2}\right) + PN_m(q), \\ t = (q-1)N + \frac{N}{2} \sim qN \end{bmatrix}$$

In Equation 7 above, q represents the index of the OFDM symbol, and N represents one OFDM symbol length.

Hereinafter, in FIGS. 23 to 25, performance of phase noise estimation according to an embodiment of the present disclosure will be described in comparison with the conventional method.

FIG. 23 is a diagram for describing the performance of phase noise estimation according to the method proposed in the present disclosure by comparing with the prior art.

FIG. 23 is a graph illustrating four phase noises.

Specifically, the graph shows 1) actual phase noise (PN original), 2) PN estimated from the CPE calculated based on the conventional PTRS (PN PTRS), 3) PN estimated using interpolation with the CPE (PTRS interpolation), and 4) PN estimated according to the method proposed in the present disclosure (Proposed scheme).

Referring to FIG. 23, it may be identified that the proposed scheme of the present disclosure may more accurately estimate the PN in the time domain compared to the conventional scheme according to 2) and 3). The form of the PN estimated according to the proposed scheme of the present disclosure is similar to the form of the actual PN (PN original).

FIGS. 24 and 25 are diagrams for describing a block error rate (BER) when the method proposed in the present disclosure is applied by comparing with the conventional scheme.

FIGS. 24 and 25 illustrate block error rates (BER) in an additive white Gaussian noise channel.

FIG. 24 is a graph illustrating a block error rate (BER) according to Signal to Noise Ratio (SNR) when PN Power Spectrum Density (PSD) is −67 dBc/Hz and 64 Quadrature Amplitude Modulation (QAM) is used as a modulation scheme.

FIG. 25 is a graph illustrating a block error rate (BER) according to the PN power spectrum density (PSD) when the signal to noise ratio (SNR) is 20 dB and 64 Quadrature Amplitude Modulation (QAM) is used as the modulation scheme.

Referring to FIGS. 24 and 25, it may be identified that the method according to the embodiment of the present disclosure (proposed scheme) has a BER gain of up to 40% compared to the conventional scheme (PTRS interpolation).

Hereinafter, effects of the method for estimating the phase noise according to an embodiment of the present disclosure will be described.

The method for estimating the phase noise according to the above-described embodiment may be used to improve the performance of a 5G NR scheme (a method for compensating the PN based on the PTRS).

The method for estimating the phase noise according to an embodiment of the present disclosure utilizes a conventional CP interval as an interval through which the PN pilot is transmitted, so the effect on the entire system may be minimized. That is, the method for estimating the phase noise according to the embodiment has backward compatibility.

When communication is performed in a high frequency band, the power spectral density (PSD) of phase noise (PN) increases significantly, and thus PN estimation and compensation act as very important factors. The method for estimating the phase noise according to an embodiment of the present disclosure may more effectively support a wireless communication system (Wifi using 60 GHz, 6G communication system) utilizing a high frequency band.

That is, according to an embodiment of the present disclosure, the phase noise may be estimated more accurately than conventional scheme. Accordingly, 1) performance in terms of the block error rate (BER) may be enhanced and 2) total throughput may be increased because a higher Modulation and Coding Scheme level (MCS) may be used.

As described above, according to an embodiment of the present disclosure, performance of high frequency band communication may be improved and reliability may be guaranteed.

In terms of implementation, the operations related to the estimation of the phase noise according to the above-described embodiments may be processed by apparatuses (e.g., processors 102 and 202 in FIG. 28) in FIGS. 27 to 31 to be described below.

Further, the operations related the estimation of the phase noise according to the above-described embodiment may also be stored in memories (e.g., 104 and 204 in FIG. 28) in the form of an instruction/program (e.g., instruction or executable code) for driving at least one processor (e.g., 102 and 202 in FIG. 28).

Hereinafter, the above-described embodiments will be described in detail with reference to FIG. 26 in terms of the operation of the wireless device. Methods to be described below are just distinguished for convenience and it is needless to say that some components of any one method may be substituted with some components of another method or may be applied in combination with each other. The wireless device may be a wireless device (e.g., a UE/a BS) based on FIGS. 27 to 31 to be described later.

FIG. 26 is a flowchart for describing a method for estimating, by a wireless device, a phase noise in a wireless communication system according to an embodiment of the present disclosure.

Referring to FIG. 26, a method for estimating phase noise by a wireless device in a wireless communication system according to an embodiment of the present disclosure includes: receiving a pilot signal and a phase tracking reference signal (S2610); calculating a first phase noise based on the pilot signal (S2620); calculating a common phase error based on the phase tracking reference signal (S2630); and estimating phase noise based on the first phase noise and the common phase error (S2640).

In S2610, the wireless device (UE or BS) receives, from another wireless device (BS or UE), a pre-configured pilot signal and a phase tracking reference signal (PTRS). The pre-configured pilot signal may be a signal based on a PN pilot according to the above-described embodiment. In this case, the pre-configured pilot signal may be configured by PTRS configuration information of FIG. 17.

The pre-configured pilot signal and the phase tracking reference signal may be transmitted through an uplink channel or a downlink channel. For example, when the phase tracking reference signal is transmitted through the downlink channel, the wireless device may be the UE and the other wireless device may be the BS. As another example, when the phase tracking reference signal is transmitted through the uplink channel, the wireless device may be the BS and the other wireless device may be the UE.

According to an embodiment, the pre-configured pilot signal may be transmitted in one region of a time domain allocated for a cyclic prefix (CP) of the PTRS. The one region may be positioned at a frontmost portion of the time domain allocated for the CP. The embodiment may be based on the above-described method 2 in relation to a structure of the PN pilot.

According to an embodiment, the pre-configured pilot signal may be transmitted in a specific time domain. The pre-configured pilot signal may be positioned before the time domain allocated for the cyclic prefix (CP) of the PTRS. The embodiment may be based on the above-described method 1 in relation to the structure of the PN pilot.

According to the above-described S2610, an operation of a wireless device (100/200 of FIGS. 27 to 31) which receives the pre-configured pilot signal and the phase tracking reference signal (PTRS) from another wireless device (100/200 of FIGS. 27 to 31) may be implemented by the apparatuses of FIGS. 27 to 31. For example, referring to FIG. 28, one or more processors 102/202 may control one or more transceivers 106/206 and/or one or more memories 104/204 to receive the pre-configured pilot signal and the phase tracking reference signals from another wireless device 200/100.

In S2620, the wireless device (UE or BS) calculates the first phase noise based on the pre-configured pilot signal.

According to an embodiment, the first phase noise may be based on a mean of the phase noise during a time duration for which the pre-configured pilot signal is transmitted. The first phase noise may be a value calculated in the time domain based on the pre-configured pilot signal (PN pilot described above). Specifically, the first phase noise may be based on $PN_{est}(q)$ of Equation 3 above.

According to the above-described S2620, an operation which the wireless device (100/200 of FIGS. 27 to 31) which calculates the first phase noise based on the pre-configured pilot signal may be implemented by the apparatuses of FIGS. 27 to 31. For example, referring to FIG. 28, one or more processors 102/202 may control one or more transceivers 106/206 and/or one or more memories 104/204 so as to calculate the first phase noise based on the pre-configured pilot signal.

In S2630, the wireless device (UE or BS) calculates a common phase error (CPE) based on the phase tracking reference signal (PTRS).

According to an embodiment, the common phase error (CPE) may be a value calculated in a frequency domain based on the phase tracking reference signal (PTRS). That is, the common phase error (CPE) may be based on $CPE_{PTRS}(q)$ of Equation 4 above.

According to the above-described S2630, an operation which the wireless device (100/200 of FIGS. 27 to 31) which calculates the common phase error (CPE) based on the phase tracking reference signal (PTRS) may be implemented by the apparatuses of FIGS. 27 to 31. For example, referring to FIG. 28, one or more processors 102/202 may control one or more transceivers 106/206 and/or one or more memories 104/204 so as to calculate the common phase error (CPE) based on the phase tracking reference signal (PTRS).

In S2640, the wireless device (UE or BS) estimates phase noise (PN) based on the first phase noise and the common phase error (CPE).

According to an embodiment, the PN may be estimated through interpolation based on a specific reference point. The specific reference point may be based on the first phase noise and the CPE.

According to an embodiment, at least one time function related to the PN may be determined based on the specific reference point and the first phase noise. A mean of integral values based on the at least one time function may be equal to the CPE. The embodiment may be based on Equation 5 above. In this case, the at least one time function may include at least one of PN1t(t) or PN2(t). The specific reference point may mean a new reference point of the interpolation.

According to an embodiment, the specific reference point may satisfy the following equation.

$$PN_m(q) = 2CPE_{PTRS}(q) - \frac{1}{2}PN_{est}(q) - \frac{1}{2}PN_{est}(q+1)$$

Here, q may represent the symbol index, $PN_m$ may represent the specific reference point, $CPE_{PTRS}$ may represent the CPE, and $PN_{est}$ may represent the first phase noise.

According to the above-described S2640, an operation which the wireless device (100/200 of FIGS. 27 to 31) which estimates a phase noise (PN) based on the first phase noise and the common phase error (CPE) may be implemented by the apparatuses of FIGS. 27 to 31. For example, referring to FIG. 28, one or more processors 102/202 may control one or more transceivers 106/206 and/or one or more memories 104/204 so as to estimate the phase noise (PN) based on the first phase noise and the common phase error (CPE).

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 6G) between devices.

Hereinafter, a description will be certain in more detail with reference to the drawings. In the following drawings/description, the same reference symbols may denote the same or corresponding hardware blocks, software blocks, or functional blocks unless described otherwise.

FIG. 27 illustrates a communication system 1 applied to the present disclosure.

Referring to FIG. 27, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices Applied to Present Disclosure

FIG. 28 illustrates wireless devices applicable to the present disclosure.

Referring to FIG. 28, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 27.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of a Signal Process Circuit for a Transmission Signal Applied to Present Disclosure FIG. 29 illustrates a signal process circuit for a transmission signal applied to the present disclosure.

Referring to FIG. 29, a signal processing circuit 1000 may include scramblers 1010, modulators 1020, a layer mapper 1030, a precoder 1040, resource mappers 1050, and signal generators 1060. An operation/function of FIG. 29 may be performed, without being limited to, the processors 102 and 202 and/or the transceivers 106 and 206 of FIG. 28. Hardware elements of FIG. 29 may be implemented by the processors 102 and 202 and/or the transceivers 106 and 206 of FIG. 28. For example, blocks 1010 to 1060 may be implemented by the processors 102 and 202 of FIG. 28. Alternatively, the blocks 1010 to 1050 may be implemented by the processors 102 and 202 of FIG. 28 and the block 1060 may be implemented by the transceivers 106 and 206 of FIG. 28.

Codewords may be converted into radio signals via the signal processing circuit 1000 of FIG. 29. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 29. For example, the wireless devices (e.g., 100 and 200 of FIG. 28) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of a Wireless Device Applied to Present Disclosure

FIG. 30 illustrates another example of a wireless device applied to the present disclosure. The wireless device may be implemented in various forms according to a use-case/service (refer to FIG. 27).

Referring to FIG. 30, wireless devices 100 and 200 may correspond to the wireless devices 100 and 200 of FIG. 28 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 28. For example, the transceiver(s) 114 may include the one or more transceivers 106 and 206 and/or the one or more antennas 108 and 208 of FIG. 28. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 27), the vehicles (100b-1 and 100b-2 of FIG. 27), the XR device (100c of FIG. 27), the hand-held device (100d of FIG. 27), the home appliance (100e of FIG. 27), the IoT device (100f of FIG. 27), a digital broadcast terminal, a hologram device, a public safety device, an MTC device, a medicine device, a fintech device (or a finance device), a security device, a climate/environment device, the AI server/device (400 of FIG. 27), the BSs (200 of FIG. 27), a network node, etc. The wireless device may be used in a mobile or fixed place according to a use-example/service.

In FIG. 30, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of a Hand-Held Device Applied to Present Disclosure

FIG. 31 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 31, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 30, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Effects of the method and the apparatus for estimating the phase noise in the wireless according to an embodiment of the present disclosure are described below.

Since the common phase error (CPE) cannot be used as a value representing a PN value at a specific time, the CPE causes many errors as a reference point for interpolation.

According to an embodiment of the present disclosure, a first phase noise is calculated in a time region from a preset pilot signal, and the common phase error (CPE) is calculated from a phase tracking reference signal (PTRS) and phase noise (PN) is estimated through interpolation based on a specific reference point. The specific reference point is based on the first phase noise and the CPE. Therefore, interpolation for estimating phase noise is performed based on the specific reference point that can indicate a PN value at a specific time, so that estimation performance can be further improved.

In order to determine the specific reference point, the preconfigured pilot signal must be transmitted in addition to the phase tracking reference signal (PTRS). According to an embodiment of the present disclosure, the preconfigured pilot signal is transmitted in one region of a time region allocated for a cyclic prefix (CP) of the PTRS, and the one region is positioned at a frontmost portion of the time region allocated for the CP. Therefore, it is possible to minimize InterSymbol Interference (ISI) and system change caused by adding a new pilot to an existing PTRS pilot.

In the aforementioned embodiments, the elements and characteristics of the present disclosure have been combined in a specific form. Each of the elements or characteristics may be considered to be optional unless otherwise described explicitly.

Each of the elements or characteristics may be implemented in a form to be not combined with other elements or characteristics. Furthermore, some of the elements or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

The invention claimed is:

1. A method performed by a user equipment (UE) in a wireless communication system, the method comprising:
receiving, from a base station, signal related to a cell search, wherein the signal related to the cell search includes Primary Synchronization Signal (PSS), Secondary Synchronization Signal (SSS) and Physical Broadcast Channel (PBCH);
transmitting, to the base station, a preamble for a random access procedure;
receiving, from the base station, a response for the preamble;
obtaining, from the base station, configuration information related to a plurality of reference signals (RSs),
receiving, from the base station, a first RS;
receiving, from the base station, a second RS;
estimating a first phase noise (PN) based on the first RS;
estimating a second PN based on the second RS; and
estimating a third PN based on the first PN and the second PN,
wherein the third PN is estimated through interpolation based on a specific reference point, and
wherein the specific reference point is based on the first PN and the second PN.

2. The method of claim 1, wherein the second RS is a phase tracking reference signal (PTRS) and the first RS is transmitted in a time region allocated for a cyclic prefix (CP) of the PTRS.

3. The method of claim 2, wherein the first RS is transmitted in a frontmost portion of the time region allocated for the CP.

4. The method of claim 1, wherein the second RS is a phase tracking reference signal (PTRS) and the first RS is transmitted in a specific time region and the specific time region is positioned before the time region allocated for the CP of the PTRS.

5. The method of claim 1, wherein the first PN is based on an mean of phase noise during a time duration for which the first RS is transmitted and the second PN is a common phase error (CPE).

6. The method of claim 5, wherein at least one time function related to the third PN is determined based on the specific reference point and the first PN, and
wherein a mean of integral values based on the at least one time function is equal to the CPE.

7. The method of claim 6, wherein the specific reference point satisfies the following equation, $$\llbracket PN \rrbracket\_m(q) = \llbracket 2CPE \rrbracket\_PTRS(q) - \tfrac{1}{2}\llbracket PN \rrbracket\_est(q) - \tfrac{1}{2}\llbracket PN \rrbracket\_est(q+1)$$

wherein q represents a symbol index, $\llbracket PN \rrbracket\_m$ represents the specific reference point, $\llbracket CPE \rrbracket\_PTRS$ represents the CPE, and $\llbracket PN \rrbracket\_est$ represents the first PN.

8. A user equipment (UE) operating in a wireless communication system, the UE comprising:
one or more transceivers;
one or more processors controlling the one or more transceivers; and
one or more memories operatively connectable to the one or more processors, and storing instructions of performing operations when the estimation of the phase noise is executed by the one or more processors,
wherein the operations include
receiving, from a base station, signal related to a cell search, wherein the signal related to the cell search includes Primary Synchronization Signal (PSS), Secondary Synchronization Signal (SSS) and Physical Broadcast Channel (PBCH);
transmitting, to the base station, a preamble for a random access procedure;
receiving, from the base station, a response for the preamble;
obtaining, from the base station, configuration information related to a plurality of reference signals (RSs),
receiving, from the base station, a first RS;
receiving, from the base station, a second RS,
estimating a first phase noise (PN) based on the first RS,
estimating a second PN based on the second RS, and
estimating a third PN based on the first PN and the second PN,
wherein the third PN is estimated through interpolation based on a specific reference point, and
wherein the specific reference point is based on the first PN and the second PN.

9. The UE of claim 8, wherein the second RS is a phase tracking reference signal (PTRS) and the first RS is transmitted in a time region allocated for a cyclic prefix (CP) of the PTRS.

10. The UE of claim 8, wherein the second RS is a phase tracking reference signal (PTRS) and the first RS is transmitted in a specific time region and the specific time region is positioned before the time region allocated for the CP of the PTRS.

11. The UE of claim 8, wherein the first PN is based on an mean of the phase noise during a time duration for which the first RS is transmitted and the second PN is a common phase error (CPE).

12. The UE of claim 11, wherein at least one time function related to the third PN is determined based on the specific reference point and the first PN, and
wherein a mean of integral values based on the at least one time function is equal to the CPE.

13. The UE of claim 12, wherein the specific reference point satisfies the following equation, $$\llbracket PN \rrbracket\_m(q) = \llbracket 2CPE \rrbracket\_PTRS(q) - \tfrac{1}{2}\llbracket PN \rrbracket\_est(q) - \tfrac{1}{2}\llbracket PN \rrbracket\_est(q+1)$$

wherein q represents a symbol index, $\llbracket PN \rrbracket\_m$ represents the specific reference point, $\llbracket CPE \rrbracket\_PTRS$ represents the CPE, and $\llbracket PN \rrbracket\_est$ represents the first PN.

14. One or more non-transitory computer-readable media storing one or more instructions, wherein one or more instructions executable by one or more processors are configured to instruct an apparatus to receive, from a base station, signal related to a cell search, wherein the signal related to the cell search includes Primary Synchronization Signal (PSS), Secondary Synchronization Signal (SSS) and Physical Broadcast Channel (PBCH);

transmit, to the base station, a preamble for a random access procedure;

receive, from the base station, a response for the preamble;

obtain, from the base station, configuration information related to a plurality of reference signals (RSs), receive, from the base station, a first RS;

receive, from the base station, a second RS, estimate a first phase noise (PN) based on the first RS, estimate a second PN based on the second RS, and estimate a third PN based on the first PN and the second PN, wherein the third PN is estimated through interpolation based on a specific reference point, and wherein the specific reference point is based on the first PN and the second PN.

\* \* \* \* \*